SHAFT POSITIONING BINARY DIGITAL TO ANALOG CONVERSION SYSTEM

Filed March 14, 1955 8 Sheets-Sheet 1

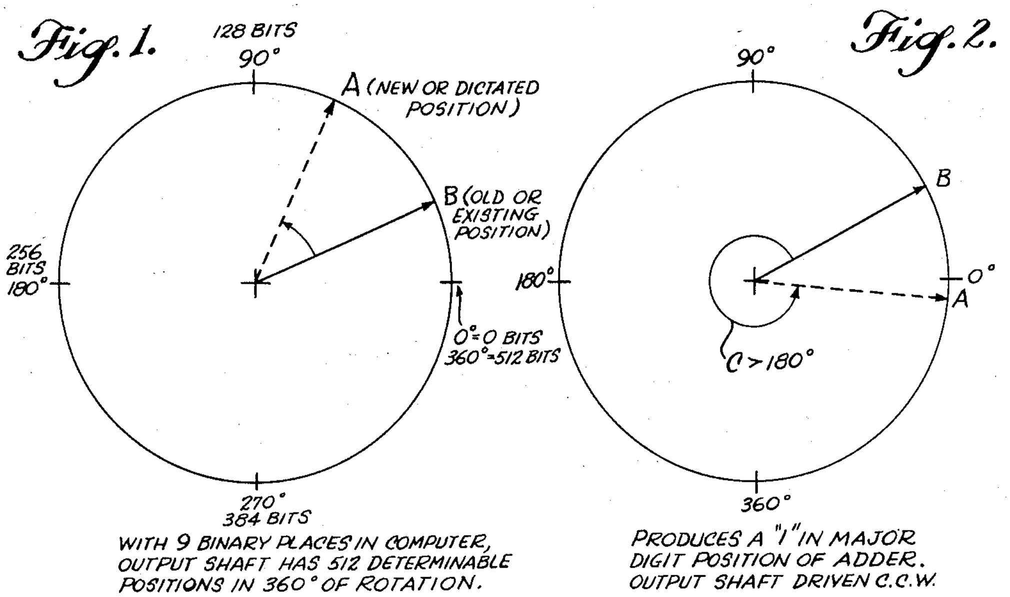

Fig. 1. Fig. 2.

WITH 9 BINARY PLACES IN COMPUTER, OUTPUT SHAFT HAS 512 DETERMINABLE POSITIONS IN 360° OF ROTATION.

PRODUCES A "1" IN MAJOR DIGIT POSITION OF ADDER. OUTPUT SHAFT DRIVEN C.C.W.

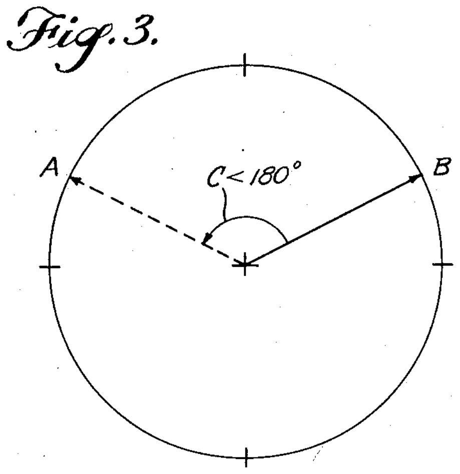

Fig. 3.

PRODUCES A "0" IN MAJOR DIGIT POSITION OF ADDER. OUTPUT SHAFT DRIVEN C. W.

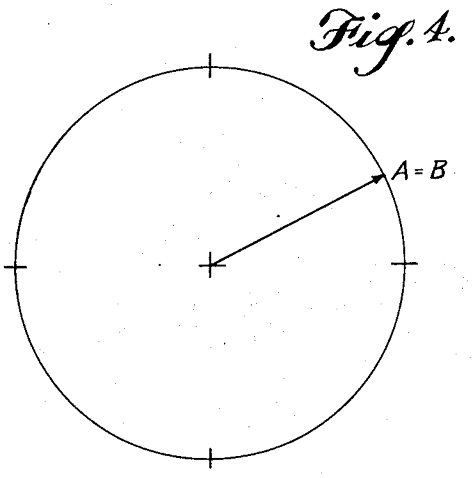

Fig. 4.

PRODUCES MOTOR START INHIBITING GATE.

INVENTORS.
JOHN E. MAYNARD
LELAND T. THOMASSON
BY FLOYD HAMILTON
Reynolds, Beach & Christensen
ATTORNEYS INVENTORS.
JOHN E. MAYNARD
LELAND T. THOMASSON
BY FLOYD HAMILTON
Reynolds, Beach & Christensen
ATTORNEYS June 18, 1957 J. E. MAYNARD ET AL 2,796,566

SHAFT POSITIONING BINARY DIGITAL TO ANALOG CONVERSION SYSTEM

Filed March 14, 1955 8 Sheets-Sheet 3

INVENTORS.
JOHN E. MAYNARD
LELAND T. THOMASSON
BY FLOYD HAMILTON

Reynolds, Beach & Christensen
ATTORNEYS

SHAFT POSITIONING BINARY DIGITAL TO ANALOG CONVERSION SYSTEM
Filed March 14, 1955 8 Sheets-Sheet 4
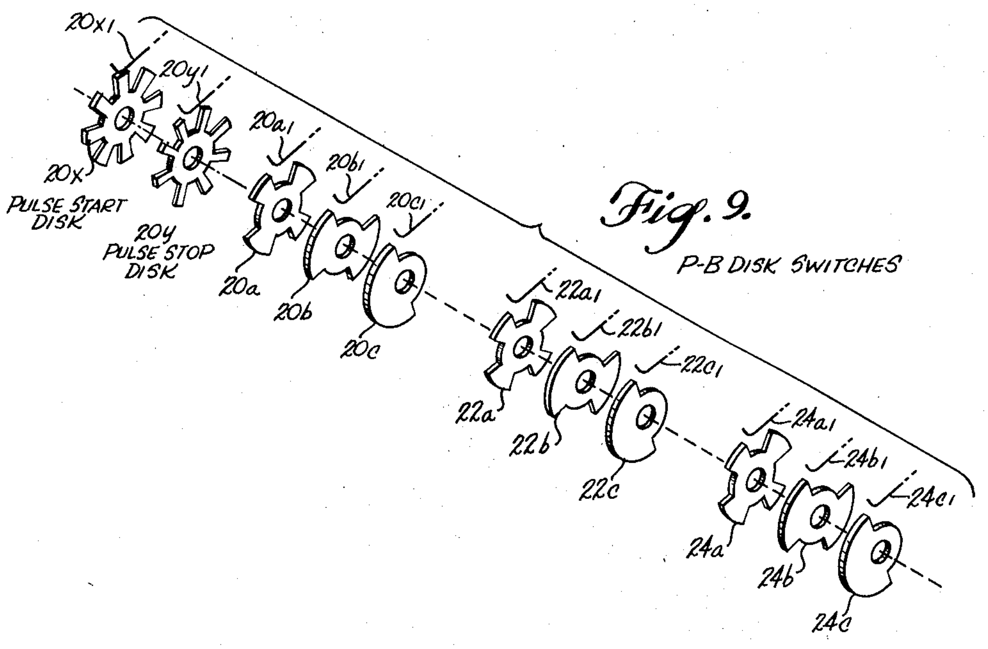
Fig. 9.
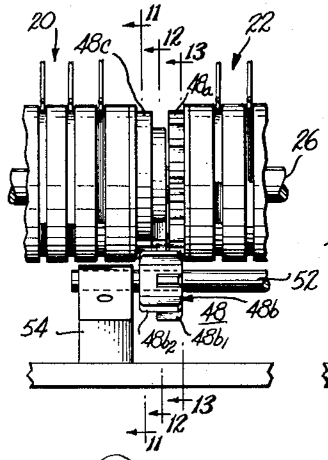
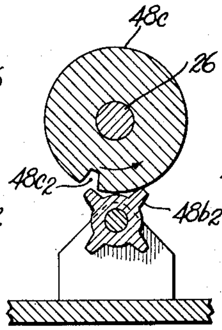
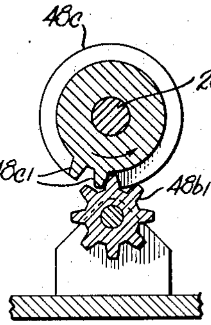
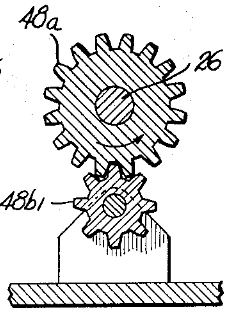
Fig. 10. Fig. 11. Fig. 12. Fig. 13.
INVENTORS.
JOHN E. MAYNARD
LELAND T. THOMASSON
FLOYD HAMILTON
BY
Reynolds, Beach & Christensen
ATTORNEYS June 18, 1957 J. E. MAYNARD ET AL 2,796,566

SHAFT POSITIONING BINARY DIGITAL TO ANALOG CONVERSION SYSTEM

Filed March 14, 1955 8 Sheets-Sheet 5

INVENTORS.
JOHN E. MAYNARD
LELAND T. THOMASSON
FLOYD HAMILTON
BY
Reynolds, Beach & Christensen

SHAFT POSITIONING BINARY DIGITAL TO ANALOG CONVERSION SYSTEM

Filed March 14, 1955 8 Sheets-Sheet 6

INVENTORS.
JOHN E. MAYNARD
LELAND T. THOMASSON
BY FLOYD HAMILTON
Reynolds, Beach & Christensen
ATTORNEYS

SHAFT POSITIONING BINARY DIGITAL TO ANALOG CONVERSION SYSTEM

Filed March 14, 1955 8 Sheets-Sheet 7

INVENTORS.
JOHN E. MAYNARD
LELAND T. THOMASSON
BY FLOYD HAMILTON

Reynolds, Beach & Christensen

ATTORNEYS

INVENTORS.
JOHN E. MAYNARD
LELAND T. THOMASSON
BY FLOYD HAMILTON
Reynolds, Beach & Christensen
ATTORNEYS United States Patent Office 2,796,566

Patented June 18, 1957

2,796,566

SHAFT POSITIONING BINARY DIGITAL TO ANALOG CONVERSION SYSTEM

John E. Maynard, Mercer Island, and Leland T. Thomasson and Floyd Hamilton, Seattle, Wash., assignors to Boeing Airplane Company, Seattle, Wash., a corporation of Delaware Application March 14, 1955, Serial No. 494,116

37 Claims. (Cl. 318—28)

This invention relates to apparatus for positioning a controlled element in accordance with binary digital information supplied to said apparatus, and more particularly relates to a system for converting binary number representations into corresponding analog representations, such as shaft rotational position. The invention is herein illustratively described by reference to its presently preferred form as applied to rapid periodic repositioning of a controlled shaft in accordance with electrical impulses or signals transmitted in successive groups representing position-controlling binary numbers employing the conventional binary code. It will be recognized, however, that the invention in its various combinations and subcombinations is not limited in form to the details of illustration employed herein.

Principal applications for the disclosed system are electrical data transmission and precision remote control devices. The data or control information to be transmitted is converted into electrical signals representing the binary digital value thereof and these signals are then transmitted through circuits or a suitable relay link to a receiving station. At the receiving station such signals are converted into the desired analog response, which in the illustrated case is shaft position. In order to bring about this conversion at the receiving station a computing apparatus is used which automatically compares the incoming binary number signals with locally generated signals representing the existing position of the controlled shaft expressed in binary digital form on the same scale as the transmitted signals. If at a given instant an incoming group of signals express a binary number which is identical to that expressed by the locally generated signals the computer will not move the controlled shaft. However, if the incoming group of signals express a larger or smaller binary number than that expressed by the locally generated signals the computer will register a difference and will move the controlled shaft by a proportional amount. The system in its over-all combination aspect is essentially a servomechanism in which the error sensing portion is a binary digital computer. As a result the accuracy is dependent on the number of binary digital places capable of expression in the computer.

A chief object of the invention, as compared with prior shaft positioning mechanisms operating on a binary code, is an improved computer apparatus to effect more direct and immediate or rapid correction of the shaft position in response to the incoming control signals.

More specifically it is an important object of this invention to provide apparatus operable in each instance to rotate the controlled shaft from its old or existing position to its new position always by the shortest of the two alternative paths. Hence the controlled shaft may be used to position an airfoil or other device requiring that the controlled shaft be capable of rotating in either direction to achieve new positions. The disclosed computer detects not only the amount of the positional error of the controlled shaft, but also the sense of the error and automatically energizes a drive motor to rotate the shaft through the smallest angle which will result in correct repositioning of the controlled shaft. In accordance with an important aspect of the invention, such movement will be clockwise or counterclockwise, depending on whether the computed difference between the binary number represented by the incoming group of signals and that registered in the computer by the locally generated signals expressing the old or existing position of the shaft is greater or smaller than a certain value.

Another object is to provide a relatively simple, compact and easily manufactured shaft position analog to digital converter for a digitally controlled shaft positioning computer. More specifically it is an object to provide a novel and improved means for converting existing shaft position into binary digital form, such converter means having the distinctive advantage of permitting incorporation of any desired number of individual converter switch disks representing different binary places without requiring unduly large-diameter disks in order to carry the necessary number of discrete switch contact segments thereon for representing the highest value binary digital places. By the same token the converter is so constituted that the circumferential width and spacing of the contact segments even with binary place disks of conveniently compact size may be made ample for convenience in manufacture and for reliable and non-critical operation.

Still another object of the invention is a reliable and effective comparator circuit capable of performing binary digital addition and subtraction. A related object is a reliable and effective computer circuit including said comparator, which automatically determines the shortest route for correct repositioning of the controlled shaft, thereby to control direction of shaft rotation in response to incoming correction signals.

A related object is to achieve such a comparator circuit which will, during shaft repositioning movement, register the progressive reduction of shaft position error digitally in the adder-subtractor circuit and, when the error reaches zero, will automatically actuate a positive-acting detent to lock the shaft precisely in the corrected position.

With the above and related objects in view the invention will be seen to reside in certain novel features, including combinations and subcombinations, as will more fully appear from the following description read in conjunction with the accompanying drawings.

Figure 1 is a diagram illustrating the relationship between the degrees scale of angular position of the controlled shaft and the corresponding bits or digits scale of binary number values of such shaft position, expressable in the illustrated (nine-place) binary converter.

Figures 2, 3 and 4 are similar diagrams illustrating the effect on computer operation of respectively different degrees of corrective movement required to move the controlled shaft from its existing position B to the new or dictated position A.

Figure 5:
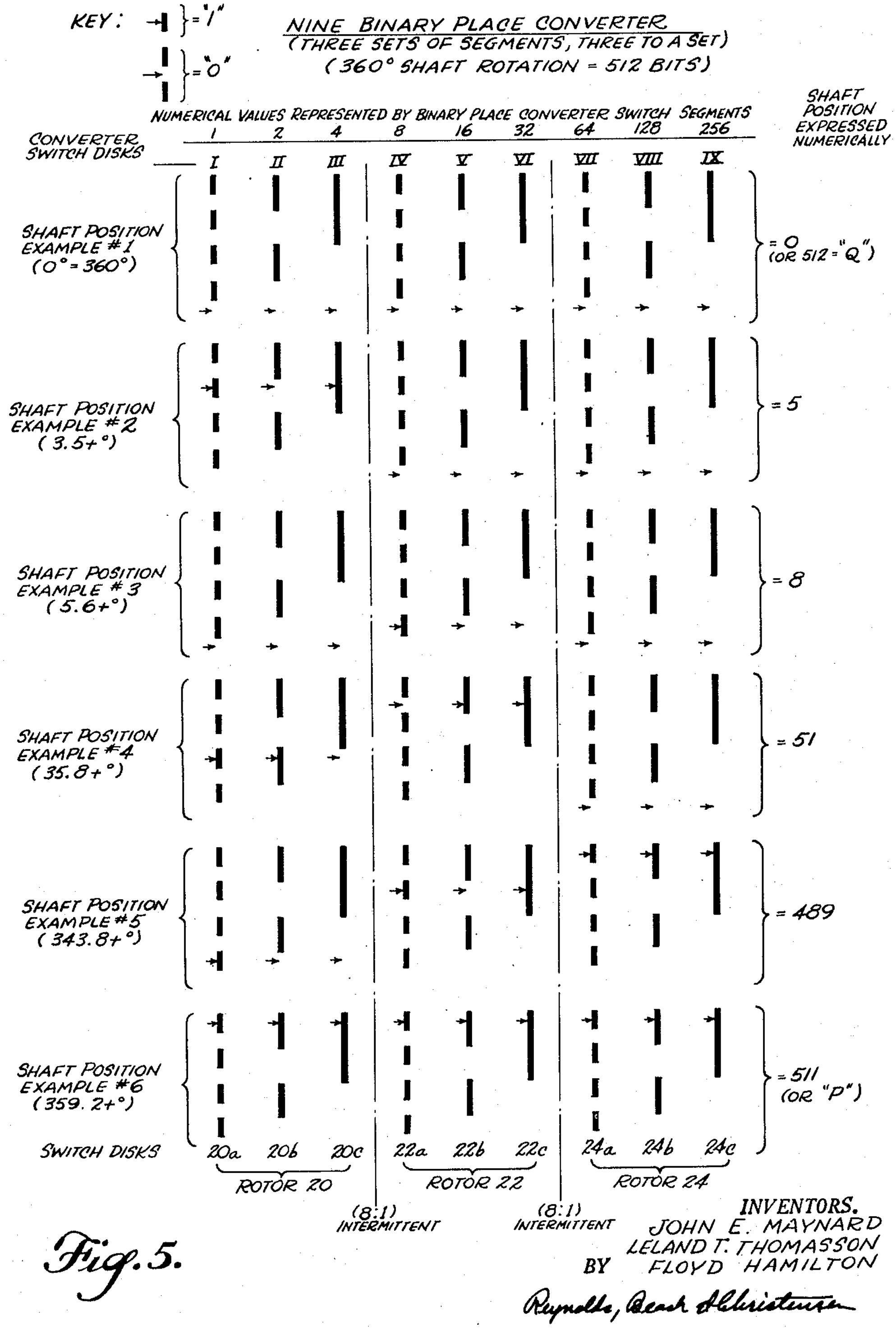
Figure 5 is a functional diagram illustrating different representative positionings of the electrical contacts of a shaft position to nine-place binary number converter having three sets of switch disks with three disks to a set, the contact segments of the respective disks being shown in developmental form for convenience of illustration.
Figure 6:
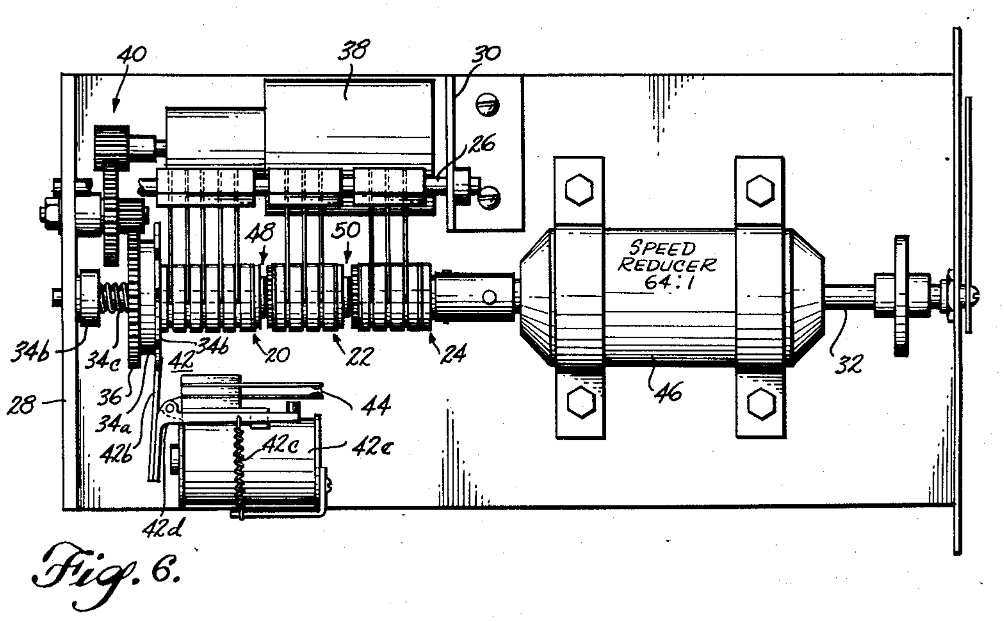
Figure 7:
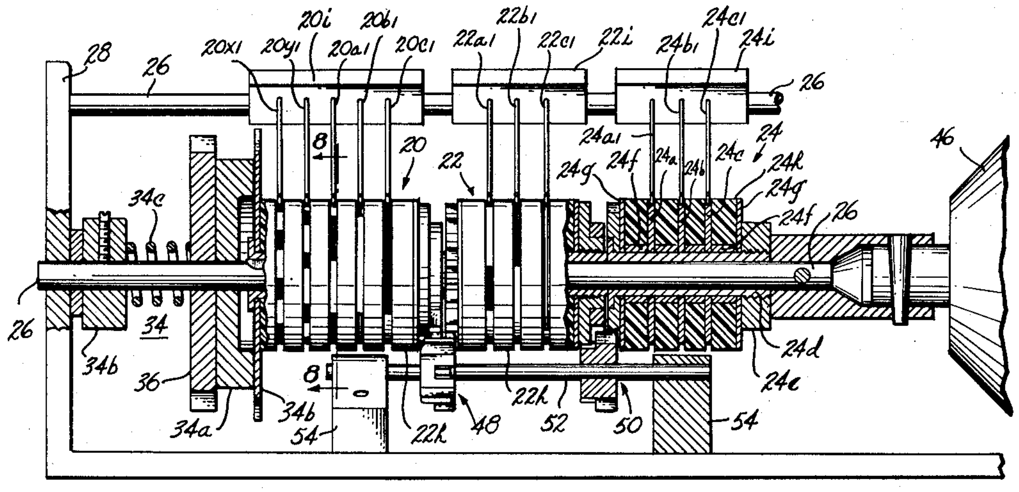
Figure 8:
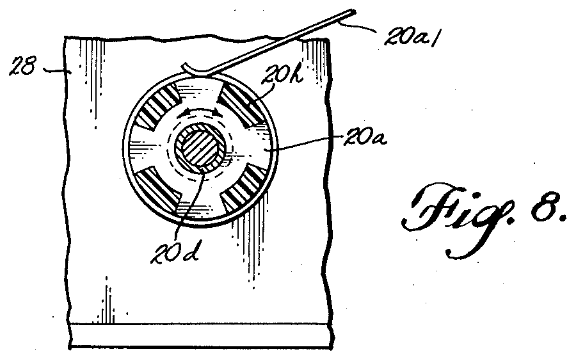

Figure 6 is a top view of a converter mechanism for performing the conversions depicted in Figure 5 and for driving the controlled shaft in accordance with energization from the computor circuits to be described. Figure 7 is an enlargement of a portion of Figure 6. Figure 8 is a transverse sectional view taken on line 8—8 in Figure 7 to illustrate the construction of a switch disk and associated contact wiper.

Figure 9 is a perspective view of the nine binary contact switch disks with contact wipers, and two associated cycling (set and reset) contact disks with wipers, used in the illustrated computor, the several disks being shown separated in an array wherein the relative rotational positions of the disks correspond to the nine-place binary digital representation of zero, or the starting position of the controlled shaft.

Figure 10 is a fragmentary portion of Figure 7, illustrating certain details of a stepping mechanism used to transmit rotation of the first set of switch disks to the second set, or from the second set to the third, with the proper speed reduction corresponding in each instance to the ratio of the binary place values of the adjacent-end segments of the driving and driven sets, respectively. Figures 11, 12 and 13 are transverse sectional views taken respectively on lines 11—11, 12—12 and 13—13 in Figure 10 to illustrate further details of this stepping mechanism.

Figure 14:
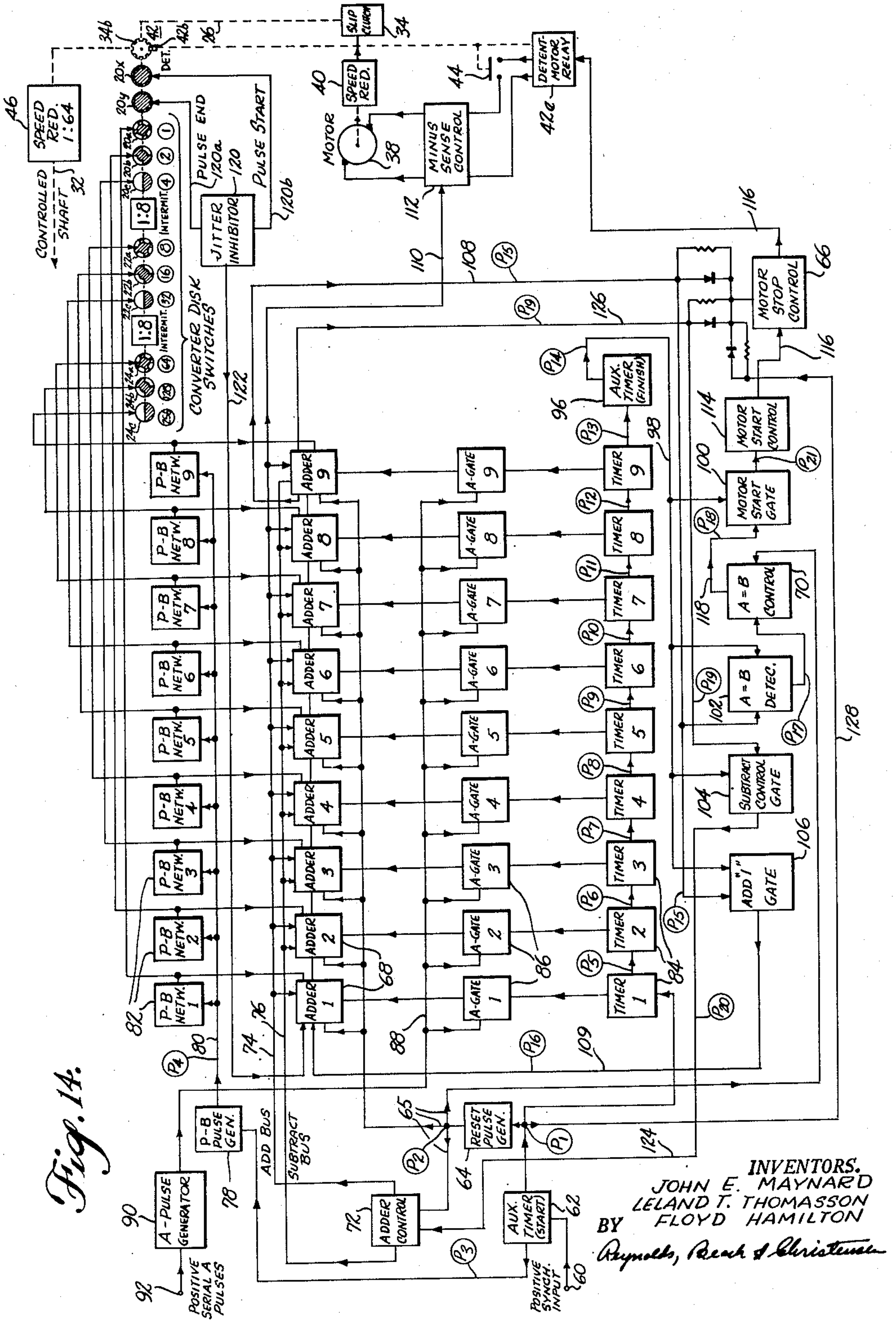

Figure 14 is an over-all block diagram of the binary digital to analog (shaft position) computer.

Figure 15:
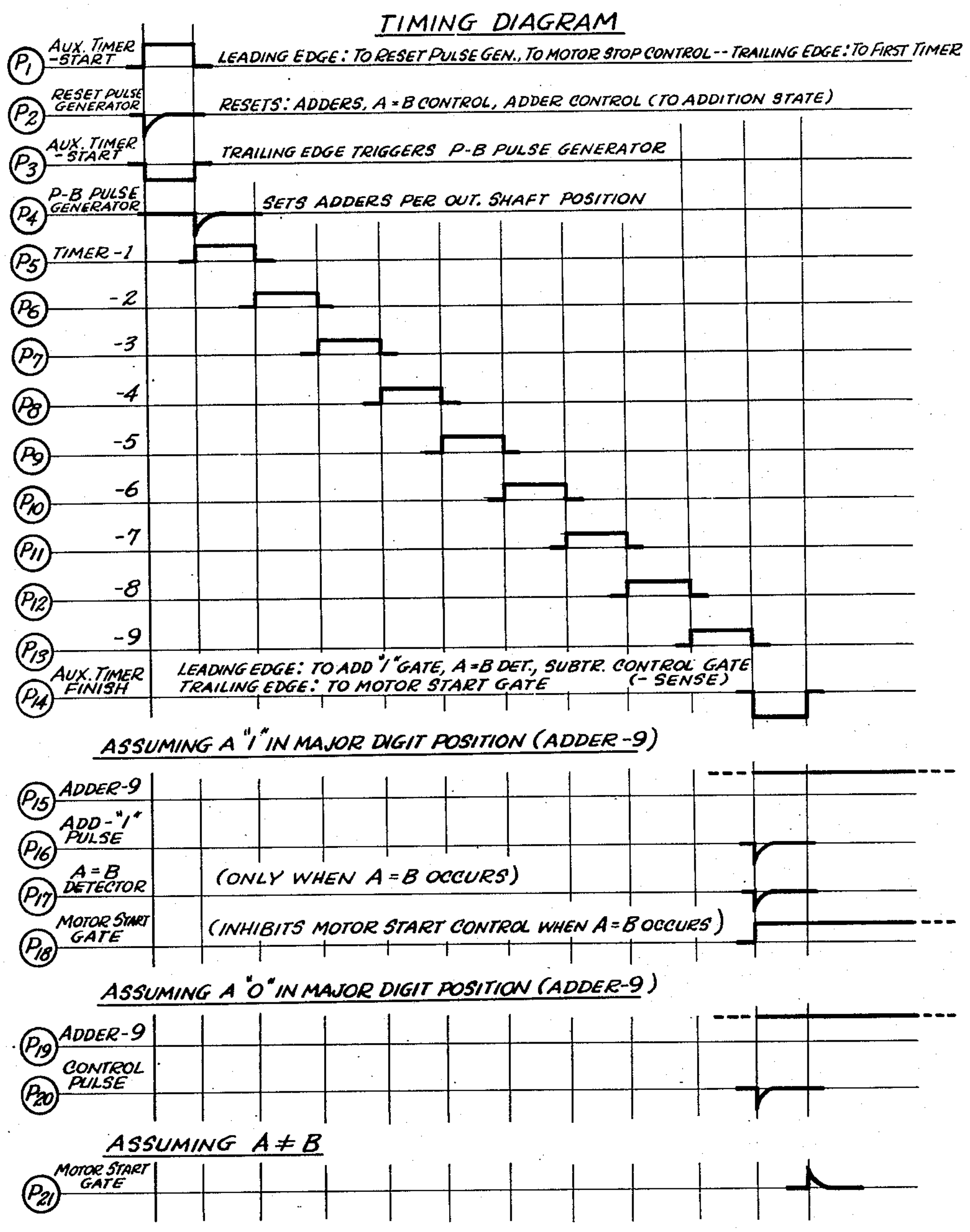

Figure 15 is a timing diagram for the computer.

Figure 16:
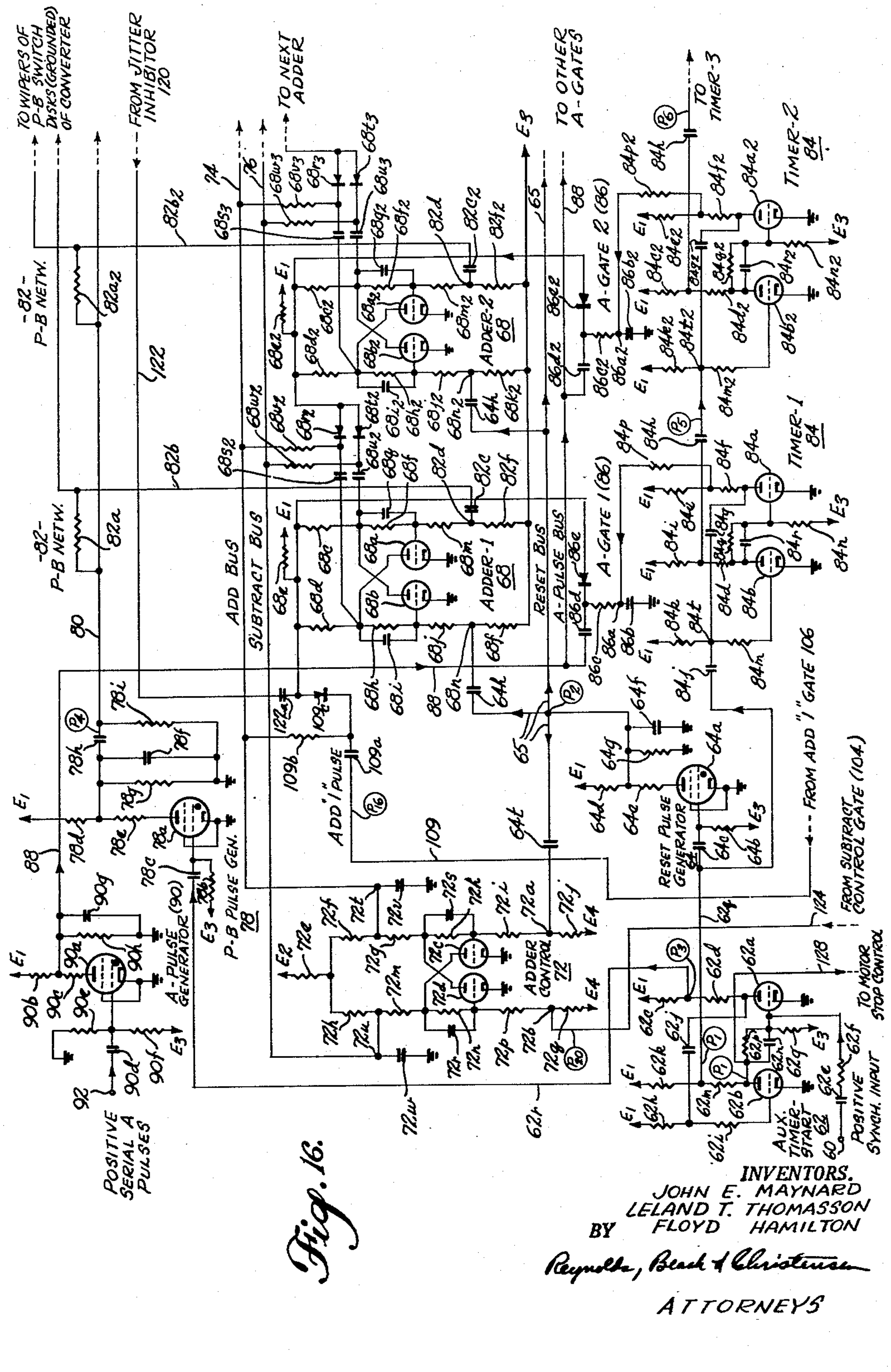
Figures 17, 18:
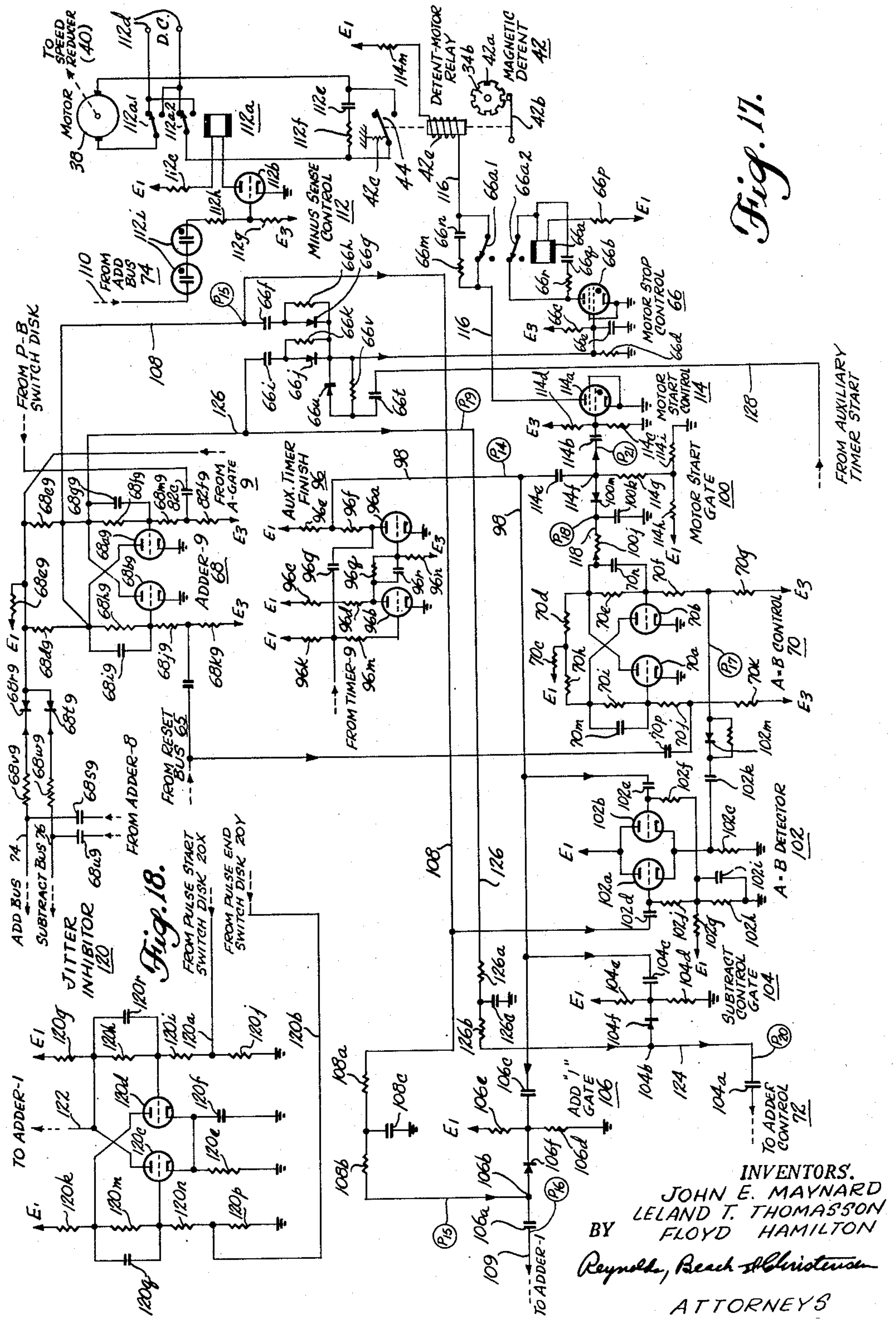

Figures 16, 17 and 18 are schematic diagrams of computer circuits, and for ease of understanding, different sections of the circuits are named in these diagrams.

USE OF BINARY SYSTEM

Use of the binary number system in digital computers, generally, is convenient particularly for the reason that this system employs only two digits or symbols, "one" and "zero," by which to express any integer. These two symbols can be expressed readily by open and closed switches, by low and high voltages, or by the presence or absence of a voltage pulse in a selected time interval, to name a few of numerous alternatives. The number of units or bits, that is the maximum numerical value, that may be expressed in binary form is determined by the available number of binary places. In a system with nine binary places any integer from zero to $2^9$, or 512, may be expressed in binary form. The presence of "ones" in all binary places represents the summation of the values assigned to all the binary places, or $1+2+4+8+16+32+64+128+256$, is 511. A zero in any binary place means that the value of that place does not enter into the summation. In a system with nine binary places the maximum number that can be expressed is 512, and this is equivalent to zero because the addition of "one" to 511 (expressed by "ones" in all binary places) requires a carryover to the next higher, or tenth, non-existent binary place; therefore, all the nine places then change from "ones" to zeroes.

Other examples of numbers expressed in binary form in a nine place system are given in the following schedule.

*Values assigned binary places*

| Example | 1 | 2 | 4 | 8 | 16 | 32 | 64 | 128 | 256 | |
|---|---|---|---|---|---|---|---|---|---|---|
| A | 0 | 0 | 1 | 0 | 0 | 0 | 0 | 0 | 0 | =4 |
| B | 1 | 0 | 0 | 1 | 0 | 0 | 0 | 0 | 0 | =9 |
| C | 0 | 1 | 0 | 1 | 0 | 0 | 0 | 0 | 1 | =266 |

As mentioned above, in a nine-place binary system the scale is 512. The disclosure herein of the present invention is based on a nine-place system, although it will be understood that this is only for purposes of illustration and that a different number of binary places may be used. In particular applications choice of the number of binary places in the computer is determined by different design factors. The major design consideration entering into this choice is, of course, the required degree of definition or accuracy of the system in expressing a particular value. Obviously a computer having nine binary places or a scale of 512 is capable of twice the accuracy of a computer having eight binary places or a scale of 256. Another and opposing design consideration is the increased complexity, bulk and cost added to the system with the incorporation of components and connections for each binary place to be added.

Referring to Figure 1, the scale of shaft position expressed in binary form to nine places permits attaining a positional accuracy of $$\frac{360}{512}=.7025$$

or .7025 degree. This is the degree of accuracy with which the illustrated system operates. As shown the symbol B represents the numerical value of the existing position of the controlled shaft and the symbol A the numerical value of the new position to which the shaft is to be rotated. For purposes of this description, by arbitrary choice the positional numbers are assumed to increase in the counterclockwise sense of shaft rotation. In Figure 1 position A is represented by a number higher than position B, but of course the opposite condition may also occur.

It has been mentioned than an important purpose of this invention is to require the computer to move the controlled shaft by the shortest route from the old position, B, to the new position, A, thereby to achieve more immediate repositionings and to permit application of the system to devices which cannot operate except through a limited angle or by bilateral control. Figures 2 and 3 diagrammatically illustrate the theory on which the novel computer operates to sense the correct direction of control movement to achieve that objective in the two general cases. In studying these figures it will be noted that the method of detection is independent of existing shaft position and of the circumstance of whether the binary number A is larger or smaller than B.

In Figure 2 a subtraction of the binary number B from the number A in the computer adder-subtractor circuit yields a difference binary number C which corresponds to more than 180 degrees of angle. This difference number registered in the computer must therefore have a "one" in the ninth binary place. The attending computer circuit condition or setting representing a "one" in the ninth binary place is automatically utilized in a manner to be described for causing the controlled shaft to move clockwise to position A. In general, whenever A minus B equals or exceeds 256 (or 180 degrees) the computer causes the controlled shaft to be driven clockwise, in order to follow the shortest path to the new position A.

In the example of Figure 3 a subtraction of B from A yields a difference C which is less than 256, so the computer adder-subtractor circuit will register a zero in the ninth binary place. Under this condition the computer will cause counterclockwise movement of the controlled shaft. In general, whenever A minus B is less than 256 (or 180 degrees) the computer causes the controlled shaft to be driven counterclockwise, in order to follow the shortest path to the new position.

The process used in the novel computer of subtracting the numbers B from A involves the complement method. In general the difference between two numbers is obtainable by adding one number to the complement of the other. For that purpose the complement of a number is the difference between that number and a predetermined reference number, namely the highest integer expressable with the limited number of digit places. In the nine-place binary digital system herein used the reference number is 512, which may be designated Q. However since the obtaining of the Q complement of one of the numbers, A or B, requires borrowing a one from the next higher (the tenth) place it is considerably more convenient to employ the complement of 511, designating 511 as P, and to add a "one" to the difference number which results when one of the numbers A or B is added to the P-complement of the other. It may be shown that the P-complement of a binary number is that number which results when the symbols representing the first number are all reversed, that is when the "ones" are changed to zeroes and the zeroes to "ones." Instrumentation of this process of forming the P complement of a number is therefore relatively simple and readily instrumented in the computer circuits. The "one" may be added (for converting to the full or Q scale) before or after the P complement of A or B is formed, or before or after the subsequent addition process is performed to obtain the difference of A minus B. In the example it is added immediately upon completion of the basic addition process if there is a "one" in the major (ninth) digit position, and at the end of the corrective movement of the controlled shaft if there is a "zero" in the major digit position. The reason for this will appear subsequently.

Thus the present invention conveniently employs the addition process, using the P complement, to perform subtraction. By taking proper account of computer circuit polarities it will be evident that the P complement of either A or B may be used. As a matter of convenience for the particular illustration herein presented the P complement of B, present shaft position, is used, but it will be recognized that various circuit connections could be rearranged to employ the P complement of A in the alternative.

To summarize the above-described illustrative operating mode of the computer, when the binary number A is injected the computer determines the rotation angle required to turn the controlled shaft from existing position B to the new position A by subtraction of B from A. This subtraction is performed by obtaining P—B then adding P—B to A and adding a "one" at a suitable time. The resulting difference number has a "zero" or a "one" in the major digit place depending on whether such difference represents less than 180 degrees of shaft rotation, or is equal to or in excess of that angle. The digit occupying the major digit place determines the smallest rotation angle for moving the shaft to position A, hence controls rotational direction. Shaft movement is initiated automatically by a motor start signal when the described computations are completed.

Figure 4 illustrates the situation where A equals B, requiring no movement of the controlled shaft. In the particular computer circuit illustrating the invention herein as will subsequently appear the motor start signal would cause the controlled shaft to rotate clockwise through 360 degrees if A were equal to B, unless such rotation were otherwise prevented. The diagram in Figure 4 mentions the production of a motor start inhibiting gate for that reason.

SHAFT POSITION TO DIGITAL CONVERTER

The computer system of the invention comprises, among other components, the comparator circuit mentioned above for performing certain operations using the binary numbers A and P—B, and the converter by which the binary number B is determined from existing shaft position in order to feed P—B into the comparator circuit. The converter will now be described.

The converter details appear in Figures 6 through 13. The converter appears schematically in the upper right-hand corner of Figure 14. Figure 5 is a diagram illustrating the operating mode of the converter.

The converter mechanism comprises three coaxially aligned switch rotors 20, 22 and 24 all supported on a shaft 26 to rotate relative to such shaft, except for rotor 20 which is keyed to the shaft. The rotor 24 has three switch disks **24*a*, 24*b* and 24*c* mounted coaxially of the shaft in axially spaced relationship on the shaft-encircling sleeve 24*d*. The disk 24*a* has four equally spaced radially projecting contact segments. The periphery of each segment occupies 45 degrees of the disk's circumference. The disk 24*b* has two equally spaced radially projecting contact segments. The periphery of each of these two segments occupies 90 degrees of the disk's circumference. The disk 24*c* has one switch contact segment occupying 180 degrees of that disk's circumference. The three disks are positioned in rotation about their common axis in fixed relationship wherein the ends of the segment of disk 24*c* line up with the ends of segments of disks 24*a* and 24*b*. The switch rotors 20 and 22** have similar sets of sleeve-mounted triple switch disks bearing corresponding identifying notations (Figure 9).

The sleeve **24*d* has a head flange at one end and at its opposite end is threaded to receive a retaining nut 24*e*. Between this flange and nut the three switch disks are clamped, positioned on the sleeve 24*d* by shim rings 24*f* interposed successively between these disks and between the endmost disks and outer end plates 24*g*. The four annular spaces between the end plates and switch disks are filled by solid insulation 24; the same is true of the notches between disk segments to present a continuous periphery for the resilient contact segment wipers 24*a*1, 24*b*1 and 24*c*1. These wipers are insulated from each other by their supporting base 24*i* and track in slidable contact with the peripheries of their associated switch disks. Shallow retaining grooves are formed in the body of insulation 24*h* to insure proper tracking. The switch rotors 20 and 22, and associated wiper assemblies have similar features of construction, the parts of which are identified by a corresponding system of numbers. A fixed shaft 26 mounted between plates 28 and 30 in parallel to shaft 26 carries the wiper supporting bases 20*i*, 22*i* and 24*i***.

The switch rotor 20, keyed to shaft 26, is made somewhat longer than the rotors 22 and 24 for the purpose of incorporating two additional switch disks **20*x* and 20*y*. Each of these disks has eight equally spaced contact segments. Those on disk 20*x* each occupy about 22½° and those on disk 20*y* occupy about 10° of disk circumference. The segments of disk 20*y* are displaced 22½° from those of disk 20*x*. Contact wipers 20*x*1 and 20*y*1 mounted on base 20*i*** engage these two disks in a manner similar to that of the other disks and wipers.

All of the switch disks are in electrical connection with shaft 26, which is grounded. As later explained more fully, switch disks **20*x* and 20*y* are employed to produce counting pulses tallied cumulatively (i. e. subtractively or additively) against the difference number registered initially in the comparator circuit, so as to detect completion of the corrective rotation of controlled shaft 32**.

The three triple sets of switch disks **20*a*—, 22*a*— and 24*a*— correspond to the nine binary places of the system and are used to represent electrically the position of controlled shaft 32 in binary digital form. In order to bring this about the switch rotor 20, together with the shaft 26, is rotatively driven through a friction clutch 34 comprising the coaxially aligned clutch plates 34*a* and 34*b*. Clutch plate 34*b* is affixed to rotor 20 while clutch plate 34*a* is pinned to a gear, 36, both the gear and the plate 34*a* being rotatable relative to the shaft. The plate 34*a* is pressed against the side of plate 34*b* by a shaft-encircling spring 34*c* reacting from a collar 34*d* fixed on the shaft 26. The pinion gear 36 is driven by a reversible motor 38 through a speed reduction gear train 40 (Figure 6). The clutch plate 34*b* serves also as the wheel of a detent 42, and to that end has eight equally spaced notches 42*a* selectively engageable by the relay-controlled detent arm 42*b*. The detent arm 42*b* comprises the extension of one arm of a bell crank 42*d*. Such bell crank arm is ferromagnetic and is subject to magnetic actuation to release the detent wheel from the detent arm 42*b* by energization of relay coil 42*e*. At the same time the motor-energizing switch 44 is closed. Upon deenergization of relay coil 42*e* the return spring 42*c* acting on the bell crank 42*d* returns the detent arm 40*b* into position to lodge in the next engageable notch 42*a* in detent wheel 34*b*, abruptly arresting rotation of shaft 26. Kinetic energy of the drive motor 38 and gear train 40 is then dissipated without effect on the switch rotor 20** and shaft 26, since the plates of clutch 34 are free to slip relatively.

The switch rotor 20 therefore rotates turn for turn directly with shaft 26 when the drive motor 38 is energized. A zero backlash speed reducer 46 interconnects the driven shaft 26 and the controlled shaft 32, and for a reason to be explained the reduction ratio is required to be 64 to 1 in the illustrated case. The switch rotor 22, rotatable relative to shaft 26, is rotatively driven by rotor 20 through an intermittent motion reversible transmission 48 and switch rotor 24, likewise rotatable relative to shaft 26, is rotatively driven by rotor 22 through an intermittent motion transmission 50 similar to transmission 48. Each of these transmissions produces one-eighth of a turn of its driven switch rotor with completion (the last one-eighth) of every full turn of its driving rotor. Thus it requires rotor 20 to turn through eight full turns to rotate rotor 24 through one-eighth of a turn. That is accomplished as rotor 20 is completing the last one-eighth of its eighth full turn and as rotor 22 is completing the last one-eighth of its first full turn. In the entire process, that is while rotor 20 is rotating through the eight full turns, the controlled shaft 32, through speed reducer 46, is being rotated progressively through one-eighth of a turn.

The intermittent transmissions 48 and 50 may be of any suitable type applicable to producing the described motions. The preferred type is that illustrated, which is generally of the nature of the so-called Veeder-Root counter mechanism such as those commonly employed in automobile odometers. In the usual odometer the base or root of the intermittent motion is ten. In its application to the present invention, however, the base or root of the intermittent motion must be such that the switching rate of the first switch disk on the driven rotor is one-half that of the last (adjacent) switch disk on the driving rotor. In the example, with one contact segment on the last disk of the drive rotor and with four contact segments on the first disk of the driven rotor the required base is eight. In general the base is twice the ratio of the number of segments on the last-mentioned disk to that on the first-mentioned disk.

The intermittent motion device 48 (refer to Figures 10 through 13) comprises a driven spur gear **48*a* fixedly mounted on the end of rotor 22. The teeth of this pinion mesh with those of the right-hand (Figure 10) section 48*b*' of idler gear 48 which rotates freely on the countershaft 52 mounted on pillow blocks 54 extending parallel to shaft 26. The gear 48*a* has twice the diameter and number of teeth as gear section 48*b*1. The teeth of gear 48*b*1 not only engage the teeth of gear 48*a* but project endwise beyond the latter to be engaged intermittently by the two spur gear teeth 48*c*1 formed on the disk 48*c*. The latter, fixedly mounted on the end of rotor 20, undergoes a diameter reduction such that its outer end portion has a diameter equal to that of the root circle of teeth 48*c*1 whereas its inner end portion has a diameter equal to that of the tip circle of such teeth. Every other tooth of gear 48 has an endwise extension 48*b*2 overlapping the inner end portion of disk 48*c*, and the latter has a gear tooth notch 48*c*2 to receive the tooth portions 48*b*2 successively as the rotor 20 rotates through successive complete turns and the idler gear 48*b* is turned thereby one quarter of a revolution by gear teeth 48*c*2 (Figure 12). Between such intermittent movements of gear 48*b* the latter, hence rotor 22, is locked against rotation due to the fact that two of the gear teeth poritions 48*b*2 are positioned astraddle the enlarged cylindrical surface of disk 48*c*** (Figure 11) and are thereby blocked against rotation.

It will therefore be evident that the idler gear teeth extensions **48*b*2 normally lock the rotor 22 against any rotation, and that during the last one-eighth of a turn of rotor 20 the teeth 48*c*1 engage idler gear teeth 48*b*1 to rotate the latter one-fourth of a turn. This produces one-eighth of a turn of rotor 22, through spur gear 48*a***, as desired.

The intermittent motion device 50 is in all respects similar to the device 48, hence requires no separate detailed description herein. After the manner described in the immediately preceding paragraph, the device 50 causes the rotor 24 to be locked against rotation except during the last one-eighth of a turn of rotor 22. As the latter occurs the rotor 24 is caused to rotate through one-eighth of a turn.

Figure 5 graphically illustrates the manner in which the converter is effective to register in the computer a set of electrical signals constituting the nine-place binary number representation of shaft position. Six examples are given, constituting typical shafts angles (stated at the left) and their equivalent binary number value (stated at the right). The heavy black lines extending vertically in the view represent a development of the switch disk contact segments, as designated, and all of these are electrically grounded in the illustrated mechanism (Figure 7). The arrows represent the switch contact wipers. For convenience in illustration it is assumed in Figure 5 that the wipers rotate (become displaced vertically in the view) and that the switch disks are stationary. The notations at the bottom of he diagram are a reminder that the rotor 24 is subjected to intermittent rotation at one-eighth the effective speed of rotor 22 and the latter in turn is subjected to intermittent rotation at one-eighth the speed of rotor 20. The key at the upper left-hand corner indicates that contact between a wiper and one if the associated switch disk segments constitutes the representation of a "one" in the section of computer circuit connected to that wiper, whereas the absence of such contact represents a "zero." Thus in the first example none of the wipers are grounded through any of their disk segments, and this condition corresponds to zero shaft angles, or Q in the binary notation selected. In the second example, rotor 20 has moved sufficiently from its initial position to register the number "5" on the binary scale. In Example No. 3 the rotor 20 has just moved through one full revolution and carried rotor 22 through its first one-eighth of a turn to register an "8." In Example No. 4 rotor 22 has been displaced through three-fourths of a turn and rotor 20 is at an intermediate position, registering "51." Example 5 shows the representation of "489," requiring contact of the switch contact segment on the last disk **24*c* of rotor 24. In the last example, expressing the number P, rotation of rotor 20** through one-eighth of a turn more in the same direction as in the sequence of the preceding examples will bring all of the rotors back to their initial or zero positions shown in Example No. 1, completing the cycle.

BLOCK DIAGRAM (FIGURE 14)

As mentioned, rapidly recurrent repositionings of the controlled shaft are effected in accordance with the dictates of recurrent groups of signals representing the changing value of the binary number A. Such signals may be fed to the computer circuit in different forms and through any of different media. The block diagram of Figure 14 and the related circuit diagrams do not show the circuits in which such signals are originally generated. These circuits could be telemeter transmitting and receiving circuits, or otherwise. Circuit techniques by which control signals representing the different binary place digits may be generated are well known and require no description herein.

In the illustration the groups of control signals representing the variable number A are fed into the computer through a single channel. Such signals are applied in the form of voltage impulses occurring with a predetermined time sequence. During each operating cycle of the system there are nine fractional, successively related time periods in which voltage pulses representing respectively the nine binary places of the number system may be received. The presence or absence of such pulses during these successively related time periods corresponds to a "one" or a "zero" in the corresponding binary places of the variable number A. Discrimination between the different impulses in each operating cycle is therefore on the basis of pulse timing. If nine separate channels are employed for the different binary places, the binary digital pulses could be applied either simultaneously or in sequence. These and other possible variations in the mode of generating and applying digital pulses to the computer will be evident to those skilled in the art, and the invention is not necessarily limited to the mode selected for illustration herein.

Each operating cycle is initiated by a positive synchronizing pulse generated by suitable means (not shown) and applied to input terminal 60. The period between successive synchronizing pulses is chosen to allow ample but usually not excessive time for the computer to determine the shaft error and for the drive motor thereupon to rotate the controlled shaft to its correct new position.

In the description which follows (based on the block diagram) reference to the timing diagram in Figure 15 will facilitate gaining an understanding of the invention. The designations P1, P2, etc., apply to wave forms and voltages appearing at designated points in the system. The synchronizing signal triggers the auxiliary timer (start) 62 which produces a rectangular pulse of predetermined duration. The leading edge of this rectangular pulse triggers the reset pulse generator 64 which in turn applies a negative pulse through reset bus 65 to the bistable adders 68 and thereby restores the adders (1 through 9) to an initial stability condition. In this initial condition the adders all register "zeroes" in the respective binary places to which they correspond. The reset pulse generator also resets the $A=B$ control 70 and establishes the bistable adder control 72 to the stability condition in which it applies bias through add bus 74 to the nine adders 68 and thereby causes the latter to function as an adder chain in response to input pulses. When the adder control 72 is placed in its opposite stability condition it applies bias through subtract bus 76 to the adders 68 and thereby causes the latter to function as a subtracting chain in response to input pulses. These events caused by the reset pulse occur substantially simultaneously with the application of the positive synchronizing pulse to the input terminal 60.

The trailing edge of the rectangular pulse produced by the monostable trigger circuit 62 (auxiliary timer-start) triggers the $P—B$ pulse generator 78 which delivers a negative-going pulse through the $P—B$ pulse bus 80 to the nine $P—B$ networks 82. These consecutively arranged networks are connected respectively to the similarly arranged adder stages 68 and corresponding converter switch disk contact wipers (**20*a*1, 20*b*1, etc.) so that when any such wiper rides on insulation of the associated switch disk to form an open circuit across the associated $P—B$ network then the $P—B$ pulse applied to that network from the bus 80 will reach the particular adder connected to that same network and trigger the adder circuit. However, if any converter switch disk contact wiper makes contact with one of the switch disk conductive segments, then it will ground out the $P—B$ network connected thereto and will prevent the $P—B$ pulse from reaching the associated adder. The polarities of the connections between the $P—B$ pulse generator and the nine-stage adder are such that the latter will register the respective digits of the P-complement of the existing position of the controlled shaft 32**. The computer is now ready to commence that portion of the operating cycle during which the digital control A-pulse signals are applied for determining the positional error $A—B$.

Termination of the rectangular pulse generated by auxiliary timer 62 produces triggering of the first of the nine consecutively arranged timers 84. These constitute monostable trigger circuits connected in cascade relationship so that termination of the pulse from the first timer stage triggers the second stage, the second likewise triggers the third, and so on until the last or ninth timer has been triggered by the eighth. Each timer produces a positive-going rectangular pulse which is applied to the corresponding A-gate 86 to enable such gate to pass a negative A-pulse if one appears on the A-pulse bus 88 during the existence of the gating pulse on the timer. The A-pulse bus 88 is fed by the A-pulse generator 90, which in turn is triggered by incoming positive pulses applied to the input terminal 92. These incoming positive pulses designated "A-pulses" represent the binary digital command signals defining the new position $A$, and are timed to occur in successive order to experience time coincidence with the respective gating pulses produced by the timers 84. The presence or absence of a serial A pulse at terminal 92 during any particular gating interval indicates a "one" or "zero" in the corresponding binary place of the binary number A representing new shaft position. A sufficient time interval is allowed between successive A-pulses to permit the adder circuits to register "carry ones." The A-pulse generator 90 is a trigger circuit which responds to the serial A pulses to produce corresponding control pulses, and its purpose is to insure that the A-pulses which reach the adders are of uniform amplitude despite possible variations is amplitude of the incoming serial A pulses.

The nine consecutively arranged A-gates 86 are connected to the correspondingly arranged adders 68 to permit the A-pulses to pass through the A-gates and trigger the respective adders with a polarity causing the adders to register the sum of the numbers $P—B$ and A. Thus, the combined timers, A-gates and adders constitute a comparator in which the existing shaft poistion B is compared with the new shaft position A by the process of adding the P-complement of B to the command number A.

It will be recalled that the true difference between the binary numbers B and A is obtained when a "one" is added to the summation of $P—B$ and A, since the reference number Q (512) required to form the full-scale complement of B is one greater than P. However, the P-complement was used because it avoided the necessity for mechanizing a borrow. At the termination of the gating pulse from the ninth timer 84 a monostable trigger circuit 96 designated auxiliary timer (finish) is triggered to generate a negative-going rectangular pulse which is applied through the bus 98 to the motor start gate circuit 100, to the $A=B$ detector circuit 102, to the subtract control gate 104 and to the add "one" gate 106. Assuming the command number A differs from the present position number B by an amount equal to or in excess of one-half Q (256) the ninth adder 68 will register a "one" in the ninth or major digit place and will apply a bias voltage through bus 108 to the add "one" gate 106. This conditions such gate to pass the pulse generated by auxiliary timer 96 and permits the latter pulse, through bus 108, to trigger the first adder stage 69 with additive polarity so as to add a "one" to the binary number registered in the nine-stage adder. Under these conditions the adders will register the true difference between the numbers A and B.

If, on the other hand, the number registered in the adders after the addition of A and $P—B$ is less than one-half Q, the ninth adder 68 will register a zero and the add one gate 106 will prevent passage of an add one pulse from auxiliary timer 96 to the first adder stage 68. Instead the corrective add one function is performed at a later time, namely on completion of the repositioning movement of the controlled shaft, as later explained.

If the ninth adder stage 68 registers a zero, the add bus applies a relatively high positive control voltage through conductor 110 to the minus sense control 112, which polarizes the voltage applied to shaft-repositioning motor 38 for counterclockwise rotation of the controlled shaft to new position A. If the ninth adder stage registers a "one,"

then the minus sense control, unenergized by voltage from conductor 110, permits energization of the motor 38 for clockwise rotation of the controlled shaft to the corrected position A. In either case the shaft is rotated through the shortest route to its new position.

Assuming A differs from B the motor 38 is started by application of the pulse from auxiliary timer 62 through the motor start gate 100 to the motor start control circuit 114 which energizes motor control relay 42*c*. The energizing circuit for this relay is formed through the motor stop control 66.

If the number A equals the number B, indicating that the controlled shaft is already in the correct position, voltage from the $A=B$ control 70 will be applied to the motor start gate 100 through the bus 118 to prevent operation of the motor start control 114. The $A=B$ control 70 comprises a bistable trigger circuit which is initially placed in one stability condition by the pulse from the reset pulse generator 64 and which is triggered into its opposite stability condition to prevent starting of the motor 38 by a pulse from the $A=B$ detector 102. The detector 102 is essentially a coincidence type circuit which operates to trigger the $A=B$ control when there is time coincidence between the leading edge of the rectangular pulse from the auxiliary timer 96. This latter pulse occurs in the following manner. If A equals B the number P (511) is registered in the nine-stage adding circuit upon completion of the addition of $P-B$ and A. The ninth adder stage then necessarily registers a "one," and when the add "one" pulse is applied through bus 109 to the adding circuits, the one in the ninth adder stage will immediately change to a zero. This change takes place during the leading edge portion of the auxiliary timer pulse which produces the add "one" pulse. Consequently, if the add "one" pulse causes the ninth adder stage to change from a "one" to a "zero," there will be a coincidence pulse applied to the $A=B$ detector for operating the $A=B$ control. Under this condition the motor start gate will be prevented from operating the motor start control and the controlled shaft will remain stationary.

The next phase in the operating cycle comprises movement of the controlled shaft to the new position A and detection of arrival at such position in order to stop the shaft and deenergize the motor. The pulse start and pulse end rotary disk switches 20*x* and 20*y*, respectively, control the jitter inhibitor 120. The jitter inhibitor comprises a bistable circuit which generates a rectangular pulse initiated with each contact between a segment of the switch disk 20*x* and its wiper and terminates with the next subsequent contact of a segment of the switch disk 20*y* and its wiper. The jitter inhibitor is used because the pulses which it produces are free of fluctuations which normally attend the transmission of electric current through sliding contacts since once the jitter inhibitor is triggered by the pulse start switch 20*x* the latter loses control and the pulse is terminated only by opposite triggering from the pulse end switch 20*y*. The resultant pulse is applied through the bus 122 to the first adder stage 68. Such pulse is repeated with each digital increment of rotation of the controlled shaft toward the new position A.

During corrective rotation of the output shaft, the binary number registered in the adder stages is progressively increased or decreased by application of the recurring pulses from the jitter inhibitor, depending upon whether the shaft is being rotated clockwise or counterclockwise, respectively, under control of the condition of the ninth binary place upon completion of the addition process, $P-B$ plus $A$. If there is a "one" in the major or ninth digit place, the adder control 72 applies a control voltage to the add bus 74, causing the adder stages to perform the addition process. If there is zero in the ninth digit place the bistable adder control is triggered to its opposite stability condition by the subtract control circuit 104 through the bus 124, causing a reversal of the voltage relationship of the add and subtract buses, which in turn causes the nine-stage adder to count down or subtract the jitter inhibitor pulses. The subtract control gate 104 is under control of the ninth adder stage and triggers the adder control to this subtract condition by permitting the differentiated leading edge of the auxiliary timer (finish) pulse (from bus 98) to pass to the adder control if there is a zero in the ninth adder stage upon completion of the addition of A and $P-B$.

Thus, during corrective movement of the controlled shaft by the motor 38 in one direction or the other, counting pulses are delivered from jitter inhibitor 120 to the adder stages which cumulatively register an increasing or a decreasing binary number. When finally the digit registered by the ninth adder stage 68 changes, a resulting pulse applied to the motor stop control 66 through either the bus 108 or the bus 126 interrupts the relay energizing bus 116 and causes deenergization of the motor 38. Simultaneously with deenergization and drop-out of relay 42*e*, the detent 42 is released and abruptly stops the controlled shaft. The friction clutch 34 absorbs the kinetic energy of the motor armature and speed reduction gearing 40.

In order to verify that reversal of the ninth adder stage 68 does cause the controlled shaft to be stopped precisely at the digital position A, consider the two possible cases. In the first case there is a "one" in the ninth adder stage when $P-B$ plus $A$ equals or exceeds one-half Q. The "add one" pulse does not change this condition, obviously, so that the "one" remains in the ninth adder stage during corrective clockwise movement of the controlled shaft. When the tally of jitter inhibitor pulses in the adder stages, added to the number A—B, becomes equal to P (or 511) the next pulse causes the ninth adder stage (and incidentally all the other adder stages as well) to change from "ones" to zeroes," indicating that the shaft has completed its travel, by the shortest route, to the new position A. At that instant the positive pulse from the ninth adder delivered through but 126 to the motor stop control 66 causes immediate locking of the controlled shaft, as desired. In the second case, when there is a zero in the major or ninth digit place upon completion of the addition of $P-B$ and A, no "add one" pulse is injected into the adder stages and the adder control supplies voltage to the subtract bus 76 causing adder stages to count down digitally as the jitter inhibitor 120 delivers pulses thereto. When the count-down tally of pulses from the jitter inhibitor just cancels out the original number $P-B$ plus A, all of the adder stages will register a zero. The next pulse from the jitter inhibitor changes all of the zeroes in the adder stages to ones, and this reversal in the ninth adder produces a positive pulse on the bus 108 which, as in the preceding case, actuates the motor stop control with the described results. Thus the "add one" function, whereby the number $P-B$ plus $A$ is corrected to $Q-B$ plus $A$ or $A-B$, as desired, is performed automatically during completion of shaft corrective movement, since the controlled shaft when rotated in the counterclockwise direction to the position A is permitted to be moved one digit past the point at which the adder stages all carry zeroes.

During the reset operation at the initiation of the system cycle a pulse from the auxiliary timer 62 is applied to the motor stop control through bus 128 to operate motor stop control 66. This prevents actuation of the motor control relay 42*e* by a reversal in the ninth adder during the reset operation.

DESCRIPTION OF SCHEMATIC (FIGURES 16, 17 AND 18)

The synchronizing or cycle-initiating positive signal applied recurringly to input terminal 60 reaches the control grid of tube 62*a* of the monostable trigger circuit 62 designated auxiliary timer (start). The function of trigger circuit 62 is to convert the positive synchronizing impulse into a rectangular wave or impulse of predictably constant amplitude and predetermined constant duration by which to initiate certain operating events in the computer circuits.

Trigger circuit 62 comprises the two triodes 62a and 62b. Triode 62a receives plate voltage from a source E1 through the serially connected plate resistances 62c and 62d. Its control grid is connected to the input terminal through a coupling condenser 62e and trigger circuit isolating resistance 62f. The cathode of this tube is grounded and its control grid is normally biased to a negative value from source E3 through a grid return resistance 62g. The control grid of the opposing tube 62b is normally biased positively from source E1 through series-connected resistances 62h and 62i. The junction between these latter resistances is coupled to the anode of the tube 62a through the condenser 62j. The plate voltage for tube 62b is supplied from a point of positive potential E1 through series resistances 62k and 62m. The anode of tube 62b is coupled to the control grid of tube 62a through the parallel combination of coupling condenser 62n and resistance 62p. The positive synchronizing pulse applied to the control grid of tube 62a suddenly renders this tube conductive and initiates the transient response in which the attending drop of plate voltage in tube 62a, when coupled to the control grid of tube 62b drives the latter toward cut-off. A rectangular wave-front results, with the anode of tube 62b being relatively negative and the anode of tube 62b being positive. Since the circuit is monostable the duration of this rectangular pulse is dependent on the circuit recovery time, which is established by the bias voltages and circuit constants, according to well known design considerations. These are so chosen that the rectangular pulse is terminated at the proper instant to trigger the first timer stage 84, in accordance with the timing schedule adopted for the transmission of digital command pulses to terminal 92 following the synchronizing pulse applied to terminal 60.

The leading edge of the positive-going rectangular pulse developed in trigger circuit 62, derived from the junction of resistances 62k and 62m, triggers the reset pulse generator 64 through conductor 62q. Such leading edge (derived directly from the anode of tube 62b) is also applied to the motor stop control 66. The trailing edge of this positive pulse triggers the first timer stage. The trailing edge of the negative-going retangular pulse developed at the junction of resistors 62c and 62d is applied through conductor 62r to the $P-B$ pulse generator 78 and triggers the latter.

$P-B$ pulse generator 78 comprises a gas tetrode 78a having grounded screen and cathode and having its control grid connected to a source of negative bias potential E3 through the grid leak resistance 78b. Negative-going rectangular pulses from the trigger circuit 62 are applied to the control grid of tube 78a through conductor 62r and coupling condenser 78c. The condenser 78c and resistor 78b constitute a differentiating network deriving a positive trigger pulse from the trailing edge of this rectangular pulse so as to trigger the gas tube 78a into conduction. The plate of this tube derives voltage from a point of positive potential E1 through series-connected resistors 78d and 78e. A storage condenser 78f is shunted across the tube 78a and resistance 78e, and in turn is shunted by the resistance 78g. Normally condenser 78f is charged to a voltage determined by the source voltage E1 multiplied by the ratio of the resistance 78g to the sum of resistances 78g and 78d. On triggering of tube 78a, condenser 78f suddenly discharges through the tube and resistance 78e to form the negative-going $P-B$ pulse which is delivered through coupling condenser 78h to bus 80 for application to the $P-B$ networks 82. A resistance 78i connected between ground and conductor 80 provides a discharge path for coupling condenser 78h and somewhat lowers the output impedance of the $P-B$ pulse generator so that variations in the number of converter disk contact wipers which are grounded through the associated switch disks will produce less variation in the amplitude of the $P-B$ pulse reaching the adders.

The $P-B$ networks 82 comprise resistances 82a connected respectively between their associated $P-B$ switch disk contact wipers in the converter and the $P-B$ bus 80, as shown. The junctions between these wipers and network resistances are connected through conductors 82b and coupling condensers 82c to input points 82d in the respective corresponding adders 68. Between the input point 82d and the bias conductor 82e is connected in each instance a resistor 82f. The resistance value of individual resistors 82a is large in comparison to the resistance of the ground path through the associated $P—B$ switch disk wipers and grounded contact disk segments in the converter. Hence, if the converter disk wiper makes contact with a segment of the corresponding disk, then a negligible fraction of the $P-B$ pulse voltage applied to conductor 80 will reach the control point 82d in such adder stage, and the adder stage will not be triggered by the $P-B$ pulse. On the other hand, if the wiper rides on an insulating portion of the associated switch disk, it will present substantially an open circuit and a substantial fraction of the $P-B$ pulse voltage will reach the adder point 82d for reversing the stability condition of the stage.

The first adder stage 68 (Figure 16) comprises a bistable trigger circuit including the two triodes 68a and 68b, having grounded cathodes and having anodes connected to a source of potential E1 through separate plate resistances 68c and 68d, respectively, and the common resistance 68e. The plate of triode 68b is connected to the grid of triode 68a through the parallel combination of resistance 68f and condenser 68g. Similarly, the plate of triode 68a is connected to the control grid of triode 68b through the resistance 68h and parallel capacitance 68i. The control grid of triode 68b is connected to a point of negative bias potential E3 through the series resistances 68j and 68k. The control grid of triode 68a is similarly connected through the series resistances 68m and 82f. The junction between resistances 68m and 82f constitutes the control point 82d. The junction between resistances 68j and 68k constitutes a second control point 68n. The purpose of control point 82d has already been explained. Control point 68n is provided for applying negative-going pulses from the reset pulse generator 64 to the first adder stage.

In most respects the remaining eight consecutively arranged adders are generally similar to the first. In the drawings parts of these eight stages which correspond identically with those appearing in the first adder bear corresponding numerals with a suffix added corresponding to the numerical location of each stage in the series. Only the first, second and ninth stages appear in the drawings. The second and succeeding adders 68 are connected to be triggered by the respective adder stages next preceding them in the series. This cascade arrangement thereby provides for the necessary "carrys" and "borrows" involved in the process of addition and subtraction. The prevailing relative potentials on the add bus 74 and subtract bus 76 determine which of these processes are performed at any time. The second adder stage is connected to receive trigger pulses from the first stage at the junction between resistances 68e2 and 68d2, through either of two paths. One path comprises the rectifier 68r2 connected in series with coupling condenser 68s2 to the anode of tube 68a. The alternate trigger pulse path to the second adder comprises the rectifier 68t2 connected through coupling condenser 68u2 to the anode of triode 68b. The add bus 74 is connected to the junction between rectifier 68r2 and condenser 68s2 through resistance 68v2, and the subtract bus is similarly connected to the junction between rectifier 68t2 and condenser 68u2 through the resistance 68w2. Condenser 68u2 and resistor 68w2 constitute a differentiating network by which short negative trigger pulses are developed from one polarity reversal in the first adder for application to the second adder through rectifier 68t2. Condenser 68s2 and resistance 68v2 likewise constitute a differentiating network for deriving short trigger pulses from the opposite polarity reversal in the first adder stage, for application thereof to the second adder. If the subtract bus carries a potential which is negative relative to the add bus, then the second adder stage will be triggered to its opposite stability condition through rectifier 68t2 at the time the first adder stage undergoes a transition with the anode of triode 68b becoming negative relative to the anode of triode 68a. On the other hand, if the add bus carries a negative potential relative to the subtract bus, then the reverse transient in the first adder stage will reverse the stability condition of the second adder, through rectifier 68r2. Thus the rectifiers 68r2 and 68t2 and associated connections to the add bus and subtract bus form gating networks controlled by the relative potentials of said buses. Each succeeding adder is similarly controlled by its individual connections to the respective immediately preceding adders and to the add and subtract buses. Here as elsewhere in the circuits the use of rectifiers in various connections and gate circuits is of course for the purpose of passing voltages or pulses of one polarity from one point to another without permitting currents in the reverse direction.

The first adder stage is not controlled by the add bus and subtract bus. The reason for this is that this stage must undergo a reversal with every "count" pulse applied to it by the jitter inhibitor. Triggering pulses applied to the first adder may come from any of five sources: reset pulse generator 64, *P—B* switch contact wiper 20a' in the converter, A-pulse generator 90 (through the first A-gate 86), the "add one" gate 106, and the jitter inhibitor 120. In all five cases the applied pulses are negative. The reset pulse applied to control point 68n causes the triode 68b to become non-conductive and the triode 68a to conduct if the stage is not already in that condition, representing a zero in this first digit place. If the controlled shaft is positioned so that a *P—B* pulse appears on conductor 62b upon triggering of the *P—B* pulse generator 72, then that negative going pulse will reverse the stability condition of the first adder stage by its application to control point 82d, so that the roles of tubes 68a and 68b are reversed. A negative-going digital command pulse from the A-pulse generator 90 reaches the first adder stage through the first A-gate 86 associated therewith during application of a negative gating pulse from the first timer stage 84 to this A-gate, as will be explained at greater length hereinafter. The "add one" pulse derived from the add one gate 106 is formed by differentiating the leading edge of the negative-going rectangular pulse from the auxiliary timer (finish) 96 in the coupling condenser 109a and associated resistor 109b. This rectangular pulse is coupled to the junction between resistance 68e and the resistances 68d and 68c, through the rectifier 109c. The trigger pulse from the jitter inhibitor 120 is formed by differentiating the leading edge of the negative-going jitter inhibitor rectangular pulse. Such differentiation takes place in the coupling condenser 122a and the load resistor 68e of the first adder stage.

The second through ninth adder stages are also triggerable from five sources, including the reset pulse generator 64, the *P—B* network associated with each adder stage, the A-pulse generator and A-gate associated with such adder stage, and the alternately negative-going anodes of the two triodes in the next preceding adder stage.

Reset pulse generator 64 is generally similar to the *P—B* pulse generator in its arrangement and operation. It comprises the gas tetrode 64a having grounded screen and cathode. The control grid of this tetrode is connected to a source of negative bias potential E3 through the grid leak resistance 64b. The anode of the tube is connected to a point of positive potential E1 through the series-connected resistances 64d and 64e. The storage condenser 64f connected between ground and the junction of resistances 64d and 64e is shunted by resistance 64g. Normally this condenser stores a voltage determined potential E1 and the constants of the voltage divider comprising resistors 64d and 64g. Triggering of the gas tube 64a by the leading edge of the positive-going pulse from the auxiliary timer 62, applied through coupling condenser 64c, causes sudden discharge of storage condenser 64f. The resultant negative-going pulse is applied through reset bus 65 and coupling condenser 64h to the control point 68n in the adder stages, as well as to the adder control 72.

The nine cascaded timer stages 84 comprise monostable multivibrators, each triggering the one following it in the series on termination of its quasi-stable period. The first timer is triggered by the positive-going pulse generated in the auxiliary timer (start) 62 through the conductor 62q. The last or ninth timer stage triggers the auxiliary timer (finish) 96 at the end of the quasi-stable period of such last timer stage. The timer stages are or may be identical in form so that a description of the first stage will suffice for all.

The first timer stage comprises the triodes 84a and 84b having grounded cathodes. The plate of tube 84b receives voltage from source E1 through series-connected resistances 84c and 84d. The plate of tube 84a receives voltage from source E1 through series-connected resistances 84e and 84f. The junction between resistances 84c and 84d is connected through coupling condenser 84h to the triggering point 84t2 of the second timer stage. Input trigger pulses from conductor 62q (auxiliary timer 62) are applied to the trigger point 84t through the input coupling condenser 84j, as shown. The anode of tube 84a is connected to this trigger point through coupling condenser 84g. The trigger point 84t comprises the junction between resistances 84k and 84m. Resistance 84k is connected at one end to a point of positive potential E1, whereas resistance 84m is connected to the control grid of tube 84b. The control grid of tube 84a is connected to negative bias potential E3 through grid leak resistance 84n and to the anode of tube 84b through the parallel combination of resistor 84q and condenser 84r.

When a positive trigger pulse is applied to the trigger point 84t, a positive-going rectangular pulse is generated in the first timer stage at the junction between resistances 84e and 84f and is applied through resistance 84t as a gating pulse to the control point 86a of the first A-gate 86. The duration of this gating pulse is determined by the recovery time of the first timer, as a monostable multivibrator, which in turn depends on the values of the interstage coupling condensers and resistances and on the bias voltages applied to the two tubes of this stage, according to well known considerations in the design of multivibrators.

The components of the second timer stage shown in Figure 16 are identified by numerals similar to those applied to corresponding components in the first timer stage, with the suffix 2 after each. A similar numbering scheme is applied to the ninth timer stage shown in Figure 17.

The nine A-gates 86 are subjected to the positive gating pulses from their respectively associated timers 84 consecutively so as to permit any serial A pulses from A-pulse generator 90 to trigger the related adder stages 68. Referring to the number one A-gate 86 (Figure 16), it will be recalled that the positive gating pulse from the first timer is applied to the A-gate control point 86a. A filter 86b is connected between the point 86a and ground. The point 86a is connected to the A-pulse bus 88 through the resistance 86c and the condenser 86d. The junction between this condenser and resistor is connected through the rectifier 86e to a trigger point in the first adder stage, said trigger point comprising a junction between resistor 68e and resistors 68c and 68d. The rectifier 86e is arranged so that negative-going pulses from the A-pulse bus are permitted to reach the adder circuit whereas positive-going pulses are rejected. The condenser 86d and resistor 86c constitute a differentiating network which sharpens the pulses from the A-pulse bus before application thereof to triggering of the adder stage. The filter condenser 86b permits the time constant of this differentiating circuit to be determined by the size of resistance 86c unaffected by resistances 84p, 84f and 84e. In other words, the condenser 86b furnishes a high-frequency ground connection for the lower end of differentiating resistance 86c.

The second A-gate is also shown in Figure 16, and its components are designated with numerals similar to those applied to the first A-gate, but with the suffix 2 added.

The A-pulse generator 90 comprises the gas tetrode 90a having grounded screen and cathode. The plate of its anode is connected to a source of potential E1 through series resistances 90b and 90c. The control grid of the tube is connected to the input terminal 92 through coupling condenser 90d. This control grid receives cut-off bias voltage from the junction between resistances 90e and 90f constituting a voltage divider connected between the negative potential E3 and ground. A storage condenser 90g is connected between the junction between resistances 90b and 90c and ground and is shunted by a resistance 90h. The positive A pulses applied to input terminal 92 at intervals cause abrupt discharge of normally charged condenser 90g through the tube 90a, thereby producing negative-going A-pulses representing "ones" in the binary digital notation employed in the system. These represent the different binary place digits and pass through the A-gates corresponding respectively to such binary places because of the selective gating action of the cascaded timers 84, as previously explained.

The auxiliary timer (finish) 96 is generally similar in form and operation to the nine individual timers 84, but for design reasons in the illustrative apparatus employs somewhat different circuit constants, as indicated in the table of values listed below. The components of the auxiliary timer are designated by letters similar to those applied to functionally corresponding components of the timers 84. Termination of the rectangular pulse from the ninth timer 84 triggers the auxiliary timer 96 into its quasi-stable condition to generate a rectangular pulse of predetermined duration.

If there is a "one" in the ninth adder the add one gate 106 is enabled to apply the differentiated leading edge of the negative-going rectangular pulse from the auxiliary timer (finish) 96 to the first adder stage 68. This it does through conductor 109 and coupling condenser 106a if, as just indicated, the adder tube 68a9 is then non-conductive and its relatively positive plate potential is applied by conductor 108 to the gating point 106b in the add "one" gate 106. Differentiation of the leading edge of the auxiliary timer pulse takes place by application of such pulse through conductor 98 to the differentiating network comprising condenser 106c and ground-connected resistor 106d. The junction between the latter resistor and condenser is connected to a point of positive potential E1 through resistance 106e and to the control point 106b through the rectifier 106f. The rectifier permits flow of current in the direction from the point 106b toward condenser 106c; hence when the negative-going differential pulse is developed across resistor 106d it will produce an impulse of current through the rectifier due to the prevailing positive potential on conductor 108. Such potential is applied to the gating point 106b through the T-section filter comprising the series resistances 108a and 108b and the intermediately located condenser 108c connected to ground, as shown. The resultant trigger pulse passed through the add "one" gate causes the nine-stage adder to register a binary number increased by one digit or bit. This changes the tally from $P-B$ plus A to $Q-B$ plus A, or $A-B$.

The subtract control gate 104 is generally similar to the add one gate in that it has a differentiating network comprising the condenser 104c and resistor 104d which operates on the leading edge of the negative-going rectangular pulse from the auxiliary timer (finish) 96, applied through conductor 98. Also it has the gating point 104b to which is applied the prevailing potential of conductor 126, through the T-section filter comprising resistors 126a and 126b and the condenser 126c. Moreover, the gating point 104b is connected through the rectifier 104f to the junction between voltage divider resistors 104e and 104d, as shown. As a result, if the conductor 126 carries a relatively positive potential, corresponding to a zero in the last or ninth adder stage, then a negative trigger pulse will pass through the subtract control gate 104 to the adder control circuit 72. The connection to the latter circuit is through the conductor 124, including the coupling condenser 104a. The add one gate and the subtract control gate, therefore, operate under opposite conditions although both are controlled by the major digit position. The add one gate passes a trigger pulse to the first adder if the ninth adder stage registers a "one," whereas the subtract control gate passes a trigger pulse to the adder control if the ninth adder stage registers a zero.

The adder control circuit 72, subject to the control pulses from the subtract control gate, constitutes a bistable trigger circuit with two unistable input trigger points, 72a and 72b. The pulses from the subtract control gate are applied to the trigger point 72b, whereas the reset pulses from reset pulse generator 64 are applied to an opposite trigger point 72a. After the adder control circuit is established in one stable condition by application of a negative trigger pulse to a particular one of these trigger points, additional negative pulses applied to the same trigger point will not reverse the condition of the circuit, but a negative pulse applied to the other trigger point will do so. This adder control circuit comprises the two triodes 72c and 72d, having grounded cathodes. The circuit comprises two separate and similar voltage dividers connected between a point of positive potential E2 and a point of negative potential E4. Common to both voltage dividers is the resistance 72e connected directly to the point of potential E2. The right-hand voltage divider shown in the figure comprises, in series with resistor 72e, the successive series-connected resistances 72f, 72g, 72h, 72i and 72j. The left-hand voltage divider comprises the similarly connected resistances 72k, 72m, 72n, 72p and 72q. The trigger point 72b is the junction between resistances 72p and 72q, whereas the trigger point 72a is the junction between resistances 72i and 72j. The control grid of tube 72c is connected to the junction between resistances 72h and 72i, whereas that of tube 72d is connected to the junction between resistances 72n and 72p. Resistance 72n is by-passed by the condenser 72r and resistance 72h is similarly by-passed by the condenser 72s. The anode of tube 72d is connected to the junction between resistances 72g and 72h, whereas the anode of tube 72c is connected to the junction between resistances 72m and 72n. One output point of the circuit, 72t, is the junction between resistances 72f and 72g, which is connected to the add bus 74. The second output point 72u, the junction between resistances 72k and 72m, is connected to the subtract bus 76. Filter condenser 72d is connected from the output point 72t and ground and a similar condenser 72w is connected between the output point 72u and ground, providing stability to the adder control voltages applied to the two buses 74 and 76.

When a negative-going trigger from the reset pulse generator 64 is applied to the adder control trigger point 72a the add bus 74 becomes negative relative to the subtract bus. This is the condition under which the nine-stage adder is biased to operate in the sense of addition, that is to count up an increasing binary digital number in response to pulses applied by the jitter inhibitor, for instance, as during shaft repositioning movement. On the other hand, when a negative-going pulse from the subtract control gate 104 is applied to trigger point 72p the subtract bus is rendered negative relative to the add bus, and the nine-stage adder is conditioned to respond in subtractive manner to counting pulses applied thereto.

The motor start control 114 is triggered by the differentiated trailing edge of the negative-going rectangular pulse produced by the auxiliary timer (finish) 96. The motor start control comprises the gas tetrode 114a having grounded screen and cathode and having its control grid connected to the differentiating circuit including the condenser 114b and the grid leak resistance 114c. Grid bias is established through the voltage divider comprising the resistances 114c and 114d connected between ground and a point of negative potential E3. Application of the auxiliary timer pulse to this differentiating network occurs through conductor 98 and coupling condenser 114e. The control point 114f of the motor start gate comprises the junction between condensers 114e and 114b. This junction is connected through a resistance 114g to the junction of voltage divider resistances 114h and 114i. The latter are serially connected between ground and a point of positive potential E1.

Operation of the motor start control 114 depends on the motor start gate 100. If negative gate potential is applied through resistor 100j and conductor 118 to the control point 114f through the rectifier 100m, the negative-going rectangular pulse from the auxiliary timer (finish) 96 produces substantially no charge in the differentiating condenser 114b during the latter pulse, hence upon termination of that pulse no differentiating action takes place to produce a positive trigger causing conduction of motor start control tube 114a. However, if during the auxiliary timer (96) pulse a positive voltage is applied to the motor start gate through resistor 100j, then the motor start control tube will be triggered into conduction at the end of such auxiliary timer pulse, and establish an energizing circuit for the motor control relay 42e. Such energizing circuit includes the current limiting resistance 114m, the relay coil 42e, the normally closed upper contacts 66a1, of relay 66a, and the tube 114a. The condenser 100k acts as a short circuit for the differentiated motor start pulse at 114f when rectifier 100m is biased to conduct by the $A=B$ control 70 through resistance 100j.

The relay 66a is part of the motor stop control circuit 66. When this relay is energized the contacts 66a1 are opened, thus breaking the energizing circuit for the motor control relay 42e, to deenergize the motor 38. The motor stop control circuit comprises the gas tetrode 66b having grounded screen and cathode. The control grid of this tube receives bias voltage from the voltage divider comprising resistances 66c and 66d serially connected between ground and a point of negative potential 53. A filter condenser 66e is connected between such control grid and ground. The control grid receives positive-going trigger pulses from either the plate circuit of tube 68a9 in the ninth adder stage, or from the plate circuit of tube 68b9 in such adder stage. In the first instance the trigger pulse for tube 66b passes from conductor 108 through coupling condenser 66f and the rectifier 66g connected serially therewith and shunted by resistance 66h. In the second instance the trigger pulse passes from conductor 126 through coupling condenser 66i and the rectifier 66j connected serially therewith and shunted by resistor 66k. When the ninth adder stage is undergoing a reversal in its stability condition from a one to a zero, the motor stop control will be triggered by the leading edge of the resulting positive wave front passing through condenser 66i and rectifier 66j, whereas on the opposite reversal of the ninth adder stage the positive trigger pulse to the motor stop control will pass through condenser 66f and rectifier 66g. In either reversal of the ninth adder stage the motor stop control is triggered to cause energization of relay 66a in order to open the contacts 66a1.

At the initiation of the system cycle a trigger pulse from the auxiliary timer (start) 62 is applied to the motor stop control over conductor 128, through coupling condenser 66t, and rectifier 66u by-passed by resistance 66v to permit drainage of condenser charge after such pulse. Such triggering of the motor stop control at that time prevents untimely operation of the motor by the reset pulse acting through the ninth adder stage.

The serially connected resistance 66m and condenser 66n across these contacts minimize arcing at the contact surfaces. The normally closed lower set of contacts 66a2 of the relay 66a form the energizing circuit for the coil of this relay, such circuit including the current limiting resistance 66p, the relay coil, the contacts 66a2 and the gas tube 66b. When the gas tube is ionized and energizes the relay coil 66a, the contacts 66a2 are opened, thereby interrupting the energizing circuit for the relay coil. However, a condenser 66q, connected in series with a resistance 66r between the plate of tetrode 66b and the side of relay coil 66a opposite the energizing voltage point E1 provides brief continued energization for the relay coil through the circuit including the tube 66b, resistance 66r, condenser 66q, the relay coil and the resistance 66p. This holding period for the relay coil, determined as to duration by the size of condenser 66q, is sufficient to permit termination of the transient originally causing triggering of tube 66b, so that when the contacts 66a reclose the tube 66b will be deenergized. Moreover, by that time the motor start tube 114a is also deenergized, so that the cycle of starting, running and stopping of the motor 38 is completed, with the controlled shaft established in the corrected position A.

It has been mentioned that the function of the $A=B$ detector and $A=B$ control is to inhibit the motor start control 114 through the motor start gate 100 if the command number A is equal to the existing position number B. The $A=B$ detector 102 is essentially a coincidence type amplifier in the form of a cathode follower comprising two separate amplifier tubes 102a and 102b, having a common cathode load resistance 102c. The control grid of tube 102a is coupled through a condenser 102d to the conductor 108, which carries a relatively low potential when the ninth adder stage represents the binary digit "zero" and a relatively high positive potential when the ninth adder stage represents the binary digit "one." The control grids of both tubes 102a and 102b are biased positively in relation to ground by respective connections to the junction between voltage divider resistances 102g and 102h serially connected between ground and a point of positive potential E1. The resistance 102h, at the ground side of the voltage divider, is shunted by the filter condenser 102i which permits transient voltages to be developed at the grids of the two tubes superimposed on the constant bias potential applied thereto. The junction between resistances 102g and 102h is connected to the control grid of tube 102a through gird leak resistance 102j and to the control grid of tube 102b through the resistance 102f. The control grid of tube 102b is connected to the negative output side of auxiliary timer 96 through coupling condenser 102e, which together with resistance 102f forms a differentiating circuit producing a sharp negative pulse at the control grid of tube 102b from the leading edge of the negative rectangular pulse generated in the auxiliary timer. If the potential on conductor 108 abruptly changes from a relatively high to a relatively low positive potential as it does during the "add one" pulse if the nine-stage adder already registered the number P (511), so that the "add one" pulse changes this number to Q (all zeroes in the adder stages), the leading edge of this transient will be differentiated by the network comprising condenser 102d and resistance 102j to apply a negative pulse to the grid of tube 102a. This negative pulse will be in time coincidence with that at the control grid of tube 102b. As a result there will be a sudden drop of potential at the cathodes of the tubes 102a and 102b, which when coupled through condenser 102$k$ and rectifier 102$m$ to the $A=B$ control 70 will trigger the latter into operation. Neither of the described negative pulses applied alone to the $A=B$ detector will cause triggering of $A=B$ control 70.

The $A=B$ control 70 comprises the two tubes 70$a$ and 70$b$ connected in a bistable trigger circuit of a type generally similar to that employed in the adder control 72 previously described. In this circuit two voltage dividing networks are employed. These are connected between a point of positive potential E1 and a point of negative potential E3. The resistance 70$c$ connected to the potential E1 is common to both voltage dividers. As shown, the right-hand voltage divider comprises in series with the resistance 70$c$ the resistances 70$d$, 70$e$, 70$f$ and 70$g$. The left-hand voltage divider comprises in series with resistance 70$c$ the resistances 70$h$, 70$i$, 70$j$, and 70$k$. The resistance 70$i$ is shunted by a coupling condenser 70$m$ and the resistance 70$e$ is similarly shunted by a coupling condenser 70$n$. The junction between resistances 70$e$ and 70$f$ is connected to the control grid of tube 70$b$, whereas that between resistances 70$i$ and 70$j$ is similarly connected to the control grid of tube 70$a$. The anode of tube 70$b$ is connected to the junction between resistances 70$h$ and 70$i$ and the anode of tube 70$a$ is connected to the junction between resistances 70$b$ and 70$e$. The reset bus is connected to the junction between resistances 70$j$ and 70$k$ through the coupling condenser 70$p$, whereas the $A=B$ detector circuit 102 is connected to the junction between resistances 70$f$ and 70$g$, as shown: At the inception of each operating cycle in the system, the negative-going trigger from the reset bus 65 triggers the $A=B$ control circuit into the condition of stability wherein the anode of tube 70$a$ is positive in relation to the anode of tube 70$b$. Unless this stability condition is reversed in the $A=B$ control circuit the motor start gate circuit 100 will be free to pass the motor start trigger pulse to the control grid of the motor start tube 114$a$. However, if the $A=B$ detector circuit produces a negative output pulse in response to the condition of $A=B$, then the $A=B$ control circuit will be reversed in its stability condition and a relatively negative gating potential will be applied to the cathode of diode 100$m$, rendering the diode conductive and permitting condenser 100$k$ to short point 114$f$ to ground, thereby preventing starting of the motor 38.

It will be recalled that the minus sense control 112 normally polarizes the energizing circuit of motor 38 to rotate the controlled shaft in the clockwise direction, according to the notation adopted. The minus sense control reverses the polarity of these connections, however, when a relatively positive voltage exists on the add bus 74. The circuit accomplishing this reversal comprises the relay 112$a$ having its winding connected in series with the triode 112$b$ and the current-limiting resistor 112$c$, between ground and a source of positive potential E1. This relay has two sets of contacts 112$a$1 and 112$a$2 forming a double-pole, double-throw switch controlling the polarity of energization of the D. C.-motor 38 from the D. C. voltage terminals 112$d$, as illustrated. The energizing circuit for the motor extends through these contacts and the contacts 44 of the motor control relay 42$e$. The contacts 44 are protected by the shunt condenser 112$e$ having the current-limiting resistance 112$f$ in series therewith series-connected condenser 112$e$ and resistance 112$f$ shunted across such contacts.

The control grid of amplifier tubes 112$b$ is connected through a grid leak resistance 112$g$ to a point of negative potential E3 and through a resistance 112$h$ and two series-connected gaseous discharge diodes 112$i$ to the add bus 74 through conductor 110. The two diodes act as direct voltage dropping devices reducing the level of voltage on the add bus before application thereof to the control grid of the minus sense control tube 112$b$.

During rotation of the controlled shaft toward its new position, the wipers 20$x$1 and 20$y$1 alternately establish ground contact through the respective segments of the switch disks 20$x$ and 20$y$. As previously mentioned, the jitter inhibitor circuit generates one negative rectangular pulse with each ground contact established by the switch wiper connected to conductor 120$b$. Such pulse is terminated by ground contact established by the wiper connected to conductor 120$a$. These rectangular pulses applied to the first adder correspond to one unit or bit on the binary scale.

The jitter inhibitor 120 constitutes a bistable trigger circuit connected to the brushes 20$x$1 and 20$y$1 through the respective conductors 120$a$ and 120$b$. This circuit comprises the two triodes 120$c$ and 120$d$, having a common cathode return resistance 120$e$ shunted by a filter condenser 120$f$ establishing cathode bias on the tubes. Two identical voltage dividers are formed. That on the right side of the figure (Figure 18) comprises the series-connected resistances 120$g$, 120$h$, 120$i$ and 120$j$ extending between ground and a point of positive potential E1. That on the left comprises the similarly connected resistances 120$k$, 120$m$, 120$n$ and 120$p$. The resistance 120$m$ is shunted by coupling condenser 120$q$ and the resistance 120$h$ is shunted by the coupling condenser 120$r$. The anode of tube 120$b$ is connected to the junction between resistances 120$k$ and 120$m$, and that of tube 120$c$ is connected to the junction between resistances 120$g$ and 120$h$. The control grid of tube 120$b$ is connected to the junction between resistances 120$h$ and 120$i$, whereas the control grid of tube 120$c$ is connected to the junction between resistances 120$m$ and 120$n$. The conductor 120$a$ is connected to the junction between resistances 120$i$ and 120$j$ and the conductor 120$b$ is connected to the junction between the resistances 120$n$ and 120$p$. Grounding of either conductor 120$a$ or conductor 120$b$ reduces the potential at the control grid of the tube on the same side of the circuit, and if that tube is then more conductive than the other tube the stability condition of the circuit will thereby be reversed.

The following table of typical component types and values provides substantially complete information concerning design of the illustrated system.

*Table of voltages and component types and values*

E1=+150 volts (relative to ground)
E2=+300 volts (relative to ground)
E3=−25 volts (relative to ground)
E4=−150 volts (relative to ground)
All resistors, capacitors ±5% unless noted
Thyratron tubes—type 5696
Crystal diode rectifiers—type 1N38A
Triode tubes—type 5703
Gas diodes—type NE-2
Miscellaneous:

| | |
|---|---|
| Coil 42$e$ | ohms 600 |
| Relay 112 | Sigma DPDT 22 RJCC 5000G |
| Coil 66$a$ | ohms 300 |

Resistances:

| | |
|---|---|
| 62$c$ | 24k |
| 62$d$ | 82k |
| 62$f$ | 47k |
| 62$g$ | 470k |
| 62$h$ | 820k (±1%) |
| 62$i$ | 22k |
| 62$k$ | 15k |
| 62$m$ | 18k |
| 62$p$ | 240k |
| 64$b$ | 470k |
| 64$d$ | 300k |
| 64$e$ | 300 |
| 64$g$ | 240k |
| 66$c$ | 1M |
| 66$d$ | 820k |
| 66$k$ | 1M |
| 66$h$ | 1M |
| 66$m$ | 560 |

| | |
|---|---|
| 66r | 60 |
| 66p | 1k |
| 66v | 1M |
| 68c, 68c2 . . . 68c9 | 18k |
| 68d, 68d2 . . . 68d9 | 18k |
| 68e, 68e2 . . . 68e9 | 10k |
| 68f, 68f2 . . . 68f9 | 200k |
| 68h, 68h2 . . . 68h9 | 200k |
| 68j, 68j2 . . . 68j9 | 33k |
| 68k, 68k2 . . . 68k9 | 27k |
| 68m, 68m2 . . . 68m9 | 33k |
| 68v2 . . . 68v9 | 12k |
| 68w2 . . . 68w9 | 12k |
| 70c | 10k |
| 70d | 18k |
| 70e | 200k |
| 70f | 33k |
| 70g | 27k |
| 70h | 18k |
| 70i | 200k |
| 70j | 33k |
| 70k | 27k |
| 72e | 9.3k (20k and 18k in parallel) |
| 72f | 5.1k |
| 72g | 2.4k |
| 72h | 470k |
| 72i | 27k |
| 72j | 510k |
| 72k | 5.1k |
| 72m | 2.4k |
| 72n | 470k |
| 72p | 27k |
| 72q | 510k |
| 78b | 470k |
| 78d | 300k |
| 78e | 300 |
| 78g | 47k |
| 78i | 4.7k |
| 82a, 82a2 . . . 82a9 | 33k |
| 82f, 82f2 . . . 82f9 | 27k |
| 84c, 84c2 . . . 84c9 | 15k |
| 84d, 84d2 . . . 84d9 | 18k |
| 84e, 84e2 . . . 84e9 | 15k |
| 84f, 84f2 . . . 84f9 | 18k |
| 84k, 84k2 . . . 84k9 | 1.5M (±1%) |
| 84m, 84m2 . . . 84m9 | 22k |
| 84n, 84n2 . . . 84n9 | 62k |
| 84p, 84p2 . . . 84p9 | 15k |
| 84q, 84q2 . . . 84q9 | 240k |
| 86c, 86c2 . . . 86c9 | 12k |
| 90b | 300k |
| 90c | 300 |
| 90e | 270k |
| 90f | 620k |
| 90h | 360k |
| 96c | 15k |
| 96d | 18k |
| 96e | 24k |
| 96f | 8.2k |
| 96k | 820k |
| 96m | 22k |
| 96n | 62k |
| 96q | 240k |
| 100j | 100k |
| 102c | 47k |
| 102f | 200k |
| 102g | 200k |
| 102h | 200k |
| 102j | 200k |
| 104d | 51k |
| 104e | 27k |
| 106d | 51k |
| 106e | 27k |
| 108a | 15k |
| 108b | 33k |

| | |
|---|---|
| 109b | 12k |
| 112c | 27k |
| 112g | 470k |
| 112h | 470k |
| 112f | 100 |
| 114c | 1M |
| 114d | 470k |
| 114g | 20k |
| 114h | 68k |
| 114i | 16k |
| 114m | 400 |
| 120e | 10k |
| 120g | 10k |
| 120h | 360k |
| 120i | 150k |
| 120j | 51k |
| 120k | 10k |
| 120m | 360k |
| 120n | 150k |
| 120p | 51k |
| 126a | 15k |
| 126b | 33k |

Condensers:

| | | |
|---|---|---|
| 62e | mmf | 47 |
| 62j | mmf | 2200 |
| 62n | mmf | 15 |
| 64c | mmf | 470 |
| 64f | mmf | 1500 |
| 64h | mmf | 150 |
| 64t | mmf | 150 |
| 66e | mmf | 47 |
| 66f | mmf | 270 |
| 66i | mmf | 270 |
| 66n | mf | .05 |
| 66q | mf | .05 |
| 66t | mmf | 47 |
| 68g, 68g2 . . . 68g9 | mmf | 47 |
| 68i, 68i2 . . . 68i9 | mmf | 47 |
| 68s, 68s2, . . . 68s9 | mmf | 47 |
| 68u, 68u2 . . . 68u9 | mmf | 47 |
| 70m | mmf | 47 |
| 70n | mmf | 47 |
| 70p | mmf | 150 |
| 72r | mmf | 150 |
| 72s | mmf | 150 |
| 72v | mf | .005 |
| 72w | mf | .005 |
| 78c | mmf | 470 |
| 78f | mmf | 1500 |
| 84g, 84g2 . . . 84g9 | mmf | 2320(±2%) |
| 84h, 84h2 . . . 84h9 | mmf | 22 |
| 84j | mmf | 22 |
| 84r, 84r2 . . . 84r9 | mmf | 15 |
| 86b, 86b2 . . . 86b9 | mmf | 1500 |
| 86d, 86d2 . . . 86d9 | mmf | 47 |
| 90d | mmf | 150 |
| 90g | mmf | 1500 |
| 96g | mmf | 220 |
| 96r | mmf | 15 |
| 100k | mf | .005 |
| 102d | mmf | 100 |
| 102e | mmf | 100 |
| 102i | mf | .1 |
| 102k | mmf | 22 |
| 104a | mmf | 47 |
| 104c | mmf | 220 |
| 106a | mmf | 220 |
| 106c | mmf | 47 |
| 108c | mmf | 1000 |
| 109a | mmf | 47 |
| 112e | mf | .005 |
| 114b | mmf | 470 |
| 114e | mmf | 5700 |
| 78h | mmf | 4700 |
| 82c, 82c2 . . . 82c9 | mmf | 150 |

| | | | |
|---|---|---|---|
| 120f | mf | .65 |
| 120r | mmf | 33 |
| 120q | mmf | 33 |
| 126c | mmf | 1000 |

SYSTEM OPERATION

The operation of the over-all system will now be explained by reference to the three general conditions that may exist in the computer upon completion of the step of adding to the command number A the P-complement of the existing shaft position number B. It will be recalled that if the sum is equal to or exceeds one-half Q there will be a "one" in the ninth digit place indicating that the shortest route to the new shaft position A is in the clockwise sense. If, however, the sum referred to is less than one-half Q there will be a zero in the major digit place and the shortest route to the new shaft position A will be by counterclockwise rotation. The third condition that may arise is the case where $A=B$, in which event the sum of A and $P-B$ will be the number P, or 511, so that injection of the "add one" pulse into the nine-stage adder produces a response preventing any rotation of the controlled shaft.

Condition:

$$P-B \text{ plus } A \geqq \frac{Q}{2}$$

The condition indicated by this caption is typified in Figure 2, for instance, wherein the new shaft position A lies clockwise of the existing shaft position B by an angle less than 180°. The existing shaft position B is represented in binary digital form to nine significant places by the converter and may, for example, be thus represented as in Example No. 4 in Figure 5. In this example the shaft position angle is 35.8+°, equivalent to the binary number value of 51 on a scale of 512=360° (corresponding to nine binary places).

With the controlled shaft in position B as shown in Figure 2, application of a positive synchronizing pulse to input terminal 60 (Figures 14 and 16), triggers the auxiliary timer (start) 62 and, as indicated at $P_1$ in the timing diagram (Figure 15), the leading edge of the rectangular pulse produced by this trigger circuit 62 triggers the reset pulse generator 64. The latter delivers a reset pulse $P_2$ to the nine adder stages, restoring them to the stability condition in which the left-hand tubes are nonconductive, each representing the binary digit "zero." Likewise, the reset pulse triggers the adder control 72 to the "add" condition wherein the add bus 74 is negative in relation to the subtract bus 76, so that the added stages 68 are thereby conditioned to tally additively any input pulses applied to the first adder stage. The leading edge of the positive rectangular pulse from auxiliary timer 62 is also applied to the motor stop control 66 in order to prevent transients in the adder circuit caused by the reset pulse from producing untimely energization of the motor 38. The computer circuits are now in the reset condition and ready to continue with the operating cycle.

The next steps in the operating cycle are caused by termination of the auxiliary timer (start) pulse. The trailing end of the negative-going phase P3 of this rectangular pulse is differentiated and applied to the $P-B$ pulse generator 78 for injecting a sharp pulse into all those adder stages which correspond to converter disk switches whose wipers ride on insulation rather than grounded contact segments at that instant. This is established, of course, by the existing shaft position and is typified in Figure 4 for the illustrated case, wherein such shaft position is represented by the binary number having the value of 51. In this example it will be seen that the $P-B$ pulse is permitted by the $P-B$ networks cooperating with the converter disk switches to reach only the third, fourth, seventh, eighth and ninth stages in the nine-stage adder; hence, these stages are caused to represent the binary digit "one," whereas the first, second, fifth and sixth adder stages continue to represent the binary digit "zero." Therefore, the nine-stage adder registers the binary number $P-B$ or, in the example, 460 (511−51).

At the same instant the $P-B$ pulse generator is being triggered and is reversing the initial stability conditions of certain adder stages according to the number B, the trailing edge of the auxiliary timer pulse also triggers the first timer 84 to produce the output pulse P5 shown in the timing diagram of Figure 15. The positive phase of the timer pulse P5 is applied to the second timer whereas the negative phase thereof is applied as a gating pulse to the first A-gate 86.

Timing of the positive synchronizing pulse applied to terminal 60 with relation to the subsequent serially related A-pulses applied to terminal 92 is such that the first A-pulse must occur, if at all, during the rectangular gating pulse P5 applied to the first A-gate by the first timer. If the new position number A has a "one" in the first digit place, an A-pulse will be applied to the A-pulse bus during this time period, whereas if the number A has a zero in the first binary place, there will be no A-pulse and the first adder stage will remain in its existing condition. Termination of the rectangular pulse of the first timer triggers the second timer and in the manner previously described if the second binary place of the new position number A has a "one" the resulting gating pulse P6 from the second timer will permit passage of the A-pulse to the second adder stage. Thus the consecutively cascaded timers are triggered in cascade and provide selective gating pulses P5, P6, P7 . . . P13 permitting serial A pulses to reach only the correctly related adders. Upon completion of the gating of the ninth A-gate by the ninth timer, the nine-stage adder will register the binary number $P-B$ plus $A$, and in the condition under consideration there will be a "one" in the ninth adder due to the fact that $P-B$ plus $A$ is equal to or exceeds $$\frac{Q}{2}\ (256)$$

The trailing edge of the rectangular pulse P13, from the ninth timer, triggers the auxiliary timer (finish) 96. The leading edge of the rectangular pulse P14 from the latter circuit is applied by conductor 98 to the add "one" gate 106, and if, as in the instant example, there is a "one" in the ninth binary place, the add "one" gate will be biased (P15, Figure 15) by the ninth adder stage through conductor 108 to permit the differentiated leading edge of the pulse from auxiliary timer 96 to reach the first adder stage, as the "add one" pulse P16, and thereby cause the latter to tally an additional digit, so that the nine-stage adder represents not $P-B$ plus $A$, but $Q-B$ plus $A$, or $A-B$, as desired.

Under the assumed conditions, the rectangular pulse from the auxiliary timer 96 has no effect on the subtract control gate, nor on the $A=B$ detector. Since the adder control 72 is left in the "add" condition, the minus sense control 112 is unaffected, and the nine-stage adder is conditioned for counting up the pulses from the jitter inhibitor when the motor 38 commences to rotate the controlled shaft to the new position A.

Such motor rotation is initiated by differentiating the trailing edge of the rectangular pulse from the auxiliary timer (finish) 96 and applying the resultant pulse P21 to the motor start control 114, which forms an energizing circuit for the motor control relay 42$e$, closing the contacts 44 and establishing an energizing circuit for the motor 38 with a polarity causing clockwise rotation of the controlled shaft.

As the controlled shaft rotates through successive increments or bits on the binary scale, the switch disks 20$x$ and 20$y$ alternately trigger the jitter inhibitor circuit 120 between opposite stability conditions and produce rectangular pulses which are fed to the first adder stage, until the "one" registered in the ninth adder stage changes to a zero. That occurs with the initiation of the last jitter inhibitor pulse required to complete the change in the nine-stage adder from the number $A-B$ to $Q$ or zero (zeroes in all adder stages). Because the contact segments on the pulse start switch disk 20$x$ are phased ahead of the contact segments on the first of the nine binary place switches, i. e. 20$a$, the inception of the last jitter inhiibtor pulse precedes actual arrival of the controlled shaft at the correct new position A by a fraction of a digital increment. Thus, by differentiating the leading edge of the transition in the ninth adder stage from a "one" to a "zero" in that stage, the motor stop control 66 receives a trigger pulse a short time before the controlled shaft actually reaches position A. Consequently the opening of contacts 66$a$1 and the resultant deenergization of relay coil 42$e$ releases the magnetic detent 42 in time for stopping the controlled shaft automatically in the correct position A. Simultaneously therewith the motor control switch contacts 44 are opened to energize the motor 38. The slipping clutch 34 absorbs the kinetic energy in the motor and gear train, thereby completing one operating cycle. The next cycle is initiated with the reception of a positive synchronizing pulse at terminal 60.

Condition:

$$P-B+A<\frac{Q}{2}$$

Under this condition there is a zero registered in the major or ninth binary place (in the ninth adder stage), indicating that the shortest route to the new shaft position A is through counterclockwise rotation. As in the preceding example, the positive synchronizing pulse applied to terminal 60 triggers the auxiliary timer 62 which actuates the reset pulse generator 64 to establish the adder control 72 in the add condition and to establish all nine of the adder stages initially in the zero condition, wherein their left tubes are nonconductive (Figures 16 and 17). As before, the $P-B$ pulse generator acting through the $P-B$ networks 82 and the nine converter switch disks 20$a$, 20$b$, 20$c$, 22$a$, etc., establishes the P-complement of existing shaft position B in the nine-stage adder. Moreover, the incoming serial A pulses passing through the timer-enabled A-gates 86 reverse the stability conditions of those adder stages corresponding to the respective places of the binary number A having "ones" therein, so that the nine-stage adder next registers the binary number $P-B$ plus $A$. Upon completion of this addition process the ninth adder stage registers a zero under the instant assumed condition, and as a result the differentiated leading edge of the rectangular pulse P3 applied to the subtract control gate 104 is permitted to pass through such gate to reverse the adder control 72 to the subtract condition, since the subtract control gate is then enabled by the positive bias applied thereto (P19, Figure 15) by the ninth adder stage through conductor 126. This conditions all of the adders to count down or subtractively in response to the counting pulses from the jitter inhibitor 120 during rotation of the controlled shaft to its new position A. Also, the resultant relatively positive potential on the add bus 74 causes operation of the minus sense control 112 so as to energize the relay 112$a$ and polarize the energizing circuit connections for the motor 38 to produce counterclockwise rotation of the controlled shaft when the motor control switch 44 is closed. The latter switch is closed by energization of relay 42$e$ upon triggering of the motor start control 114 from the trailing edge of the rectangular pulse P14 from auxiliary timer 96. The add "one" gate is biased through conductor 108 so that the auxiliary timer pulse does not pass through this gate to inject an "add one" pulse into the nine-stage adder as in the preceding condition.

During rotation of the controlled shaft counterclockwise by the motor 38 toward the new position A the jitter inhibitor 120 delivers counting pulses to the nine-stage adder as in the preceding example, and when all of the adder stages register zeroes, it indicates that the number $P-B$ plus $A$ has been tallied out of the nine-stage adder so that all stages register a zero. The next pulse produces a "one" in the ninth adder stage (and all other stages incidentally), required to actuate the motor stop control 66. This deferral of actuation of the latter control by one digit, i. e. until the zeroes in the adders change to "ones," constitutes the equivalent of the "add one" pulse used under the condition:

$$P-B+A\geqq\frac{Q}{2}$$

and automatically corrects for the fact that the original computation $P-B+A$ required the addition of "one" to convert the result to $Q-B+A=A-B$.

The change from a zero to a "one" in the ninth adder stage operates the motor stop control 66 in time to release the magnetic detent so as to stop the controlled shaft in its correct new position A, as before.

Condition:

$$A=B$$

Under this condition, after completion of the serial A pulses the nine-stage adder will register a total of 511, or P, corresponding to "ones" registered in all nine adder stages. As a result, the differentiated leading edge of the rectangular pulse P14 from the auxiliary timer finish (96) will pass through the add one gate (as P16) and will tally an additional digit in the nine-stage adder, changing all nine stages from registering ones to registering zeroes. With this transition there will be a negative pulse applied through conductor 108 to the control grid of the left stage in the $A=B$ detector 102, which pulse coincides with the differentiated leading edge of the auxiliary timer pulse P14 and causes a negative going pulse P17 to be delivered from the $A=B$ detector to the $A=B$ control 70. Such triggering of the $A=B$ control applies a bias P18 to the motor start gate diode 109$m$, rendering such diode conductive and thereby preventing differentiation of the trailing edge of the rectangular pulse P14 which would otherwise occur and cause triggering of the motor start control 114. Hence the motor remains unenergized and the controlled shaft is left in its existing position.

We claim as our invention:

1. Digitally controlled servomechanism for positioning a rotatable element in accordance with a binary digital control number, comprising reversible drive means rotatively connected to said rotatable element for moving the same selectively in either direction, computer means including a plurality of consecutively cascaded binary digital registering elements having two different stability conditions representing the respective binary number digits, zero and one, converter means rotatively connected to said rotatable element and having a plurality of digit registering elements each with two different digit registering positions, said converter means elements being operatively arranged and interconnected for registering the respective binary place digits of a binary number corresponding to rotational position of said rotatable element on a scale equal to $2^n$, where $n$ is the number of digit registering elements in said converter means and in said computer means, means establishing the stability conditions of the respective computer means elements respectively in accordance with the existing positions of the converter means elements, to register a binary number corresponding to the existing position of said rotatable element, means for applying stability condition reversing signals to said computer means elements in accordance with the respective digits of a control binary number to register in said computer means a binary number corresponding to the difference between said control number and said positional number, means connected to said reversible drive means controlled by the major binary place element in said computer means for establishing direction of rotation of said rotatable element by said drive means according to the digit registered in said major binary place, means for energizing said drive means in said established direction, and means operated by rotation of said controlled element for stopping said rotatable element upon completion of rotation to a new position through an angle corresponding to said difference number.

2. The servomechanism defined in claim 1, wherein the last-mentioned means comprises means operated during rotation of the rotatable element to apply recurrent digital counting signals to the first registering element in said computer means for progressively increasing or decreasing, according to said direction of rotation, the binary number represented in said computer means as a function of shaft rotation, and means controlling said drive means, responsive to a change in the last digit place element in said computer means for stopping rotation of said rotatable element thereby.

3. The servomechanism defined in claim 2, wherein the computer means controlled by the control number and by the existing position number includes means controlling said computer means elements to register the P-complement of one of said numbers, where P is the number $2^n$ less one, and the cascading connections between the consecutively arranged computer means elements produce addition of said P-complement and the other number, for deriving a resultant difference, and means operable to add a "one" to said resultant difference, in order to register the true difference number, whereby the new position of the controlled element corresponds to the control number.

4. Apparatus for establishing the setting of a controlled element in correspondence with a binary control number having $n$ binary places, where "$n$" is an integer exceeding one, said apparatus comprising computer means having one input means arranged to be controlled by said control number and a second input means connected to be controlled by the existing setting of said controlled element, said computer means being operable to register a binary number to $n$ binary places corresponding to the difference between said control number and said existing setting number, on a scale of $2^n$, reversible drive means actuating said controlled element and in turn controlled by said computer means according to the $n^{th}$ digit registered therein, thereby to vary the setting of said controlled element in the most direct sense to the value corresponding to the control number, and means operable to interrupt said drive means, said latter means measuring the progressive change in the setting of said element to interrupt said drive means in response to a total change corresponding to said difference number.

5. Apparatus for varying the setting of a controlled element in accordance with variations in a control number expressed in binary digital form to $n$ binary places, where "$n$" is an integer greater than one, said apparatus comprising converter means having $n$ consecutively arranged binary digital elements actuated in accordance with the existing setting of said controlled element to represent the respective digits of the $n$-place binary number representation of said existing setting on a scale corresponding to the numerical value $2^n$, computer means having $n$ consecutively cascaded stages for registering the respective digits of a binary number with $n$ binary places, said computer stages having input connections subject to digital signals corresponding to the respective binary place digits of said control number and to digital signals corresponding to the respective binary place digital representations of said converter, said computer means being operable in response to said signals to register in the $n$-stages thereof the digits of a binary number corresponding to the difference between said control number and the binary number representing said existing setting, operating means selectively energizable to change the setting of said controlled element in one sense or the other, and means controlled by the $n^{th}$ stage in said converter means and in turn controlling said operating means to produce a progressive change in said setting in a sense determined by the binary digit represented in said $n^{th}$ stage.

6. Digitally controlled apparatus comprising a controlled element movable in either of opposite directions, reversible drive means operatively connected to said movable element and selectively energizable to effect movement thereof in one direction or the other, binary digital computer means having one input subject to binary digital control number information and having a second input controlled by the existing setting of said controlled element to register in said computer means a binary digital number having $n$ binary places directly related to the positional error of said controlled element relative to said digital control information, where "$n$" is an integer exceeding one, said computer means having $n$ consecutively arranged stages for registering the respective digits of said positional error binary number, and means controlled by the $n^{th}$ stage of said computer means and in turn controlling said reversible drive means to effect movement of said element in one direction or the other determined by the binary digit registered in said $n^{th}$ stage.

7. Apparatus for varying the setting of a controlled element to different values corresponding to variations up or down in a binary digital control number having "$n$" binary places, where "$n$" is any integer greater than one, said apparatus comprising computer means including "$n$" consecutively cascaded bistable stages having two different stability conditions respectively representative of the two binary digits of the respective binary places, converter means connected to said computer means, having $n$ binary digital converting elements, and control means therefor operated in accordance with the setting of said controlled element to register in said bistable stages respectively the digits defining a binary number corresponding to the existing setting of said controlled element, means controlling said computer means for deriving the difference between said control number and the binary number representation of said controlled element setting, actuating means selectively energizable to vary the setting of said controlled element in either sense of change, means controlled by the consecutively last bistable stage of said computer means in accordance with the last digit in said difference number registered therein for effecting energization of said actuating means to progressively change the controlled element setting in the direct sense to the value determined by said control number, binary digit counting means operated during said progressive change in the setting of said controlled element to tally a progressively changing binary number on a scale of $2^n$, means operatively associating the tally of said latter number with said difference number, including detecting means responsive to the condition of equality therebetween for interrupting operation of said actuating means.

8. The apparatus defined in claim 7, wherein the binary digital counting means comprises digital pulsing means reversing the stability condition of the first stage in the computer means with each digital increment of change in the controlled element setting, whereby the tally of the progressively changing binary number is registered in said computer means, and wherein the detecting means responds to a reversal in the stability condition of the last stage in said computer means.

9. The apparatus defined in claim 8, wherein the means controlling the computer means for deriving the binary numerical difference between the control number and the existing setting number includes means conditioning said computer means to register the P-complement of one of said numbers and to add the other number thereto for deriving said difference number, where P is the number $2^n-1$, and means responsive to the digital condition of the last stage of the computer means registering the difference number for reversing the stability condition of the first stage if the last stage registers a one.

10. The apparatus defined in claim 9, wherein the detecting means includes reversible adder control means responsive to the digital condition of the last stage of the computer means registering the difference number and controlling the computer means to respond additively to the digital pulsing means if said last stage registers a "one" and to respond subtractively thereto if said last stage registers a "zero."

11. The apparatus defined in claim 7, wherein the means controlling the computer means for deriving the binary numerical difference between the control number and the existing setting number includes means conditioning said computer means to register the P-complement of one of said numbers and to add the other number thereto for deriving said difference number, where P is the number $2^n-1$, and means responsive to the digital condition of the last stage of the computer means registering the difference number for reversing the stability condition of the first stage if the last registers a one.

12. The apparatus defined in claim 11, wherein the detecting means includes reversible adder control means responsive to the digital condition of the last stage of the computer means registering the difference number and controlling the computer means to respond additively to the digital pulsing means if said last stage registers a "one" and to respond subtractively thereto if said last stage registers a "zero."

13. In a digitally controlled apparatus for controlling rotation of a member to changing positions according to changes in a binary control number having $n$ places, where $n$ is an integer exceeding one, means to register the $n^{th}$ binary place digit of a binary number corresponding to the difference between said control number and the $n$-place binary number representing existing setting of said element, actuating means operable to change the setting of said element in either sense, toward correspondence with said control number, and means controlled by said first means, controlling direction of change of said setting effected by said actuating means, thereby to effect such change by the most direct route toward such correspondence setting.

14. In a digitally controlled apparatus for varying the setting of a controlled element according to changes in a binary control number having $n$ places, where $n$ is an integer exceeding one, and including computer means to register a binary number corresponding to the difference between said control number and the $n$-place binary number representing existing setting of said element, the combination with said computer means of actuating means operable to change the setting of said element in either sense, toward correspondence with said control number, and means controlled by the last digital place in said computer means, controlling direction of change of said setting effected by said actuating means, thereby to effect such change by the most direct route toward such correspondence setting.

15. The combination defined in claim 14, wherein the computer means has $n$ consecutively cascaded adder stages to register the respective binary number digits, and includes means controlled by the $n^{th}$ stage to condition said computer stages to respond additively to input digital counts applied to the first stage if the $n^{th}$ stage registers a one, and substractively to such digital counts if the $n^{th}$ stage registers a zero, and means operable during rotation of said element applying digital counts to said first stage on a binary scale of $2^n$, and means controlled by a change in said $n^{th}$ stage to interrupt operation of said actuating means.

16. Digitally controlled means for positioning a rotatable element, comprising in combination with the rotatable element, a computer circuit comprising $n$ consecutively cascaded bistable stages for registering the respective digits of a binary number of $n$ binary places, where "$n$" is an integer exceeding one, reversible adder control means conditioning said stages selectively to perform addition or subtraction in response to successive reversals in the stability condition of the first stage, reset means initially actuating said adder means to condition said stages for addition and initially actuating said stages whereby each registers the same binary digit, converter means rotatable with said rotatable element, having $n$ consecutively arranged switches, and means rotationally interconnecting said switches for alternate actuation thereof individually between opposite switching positions at respective recurrence rates proportional to the values of the binary places respectively represented thereby, a first input circuit means connected through the individual switches respectively to the correspondingly arranged computer circuit stages, said circuit means including a source of stage-reversing voltage operable after said reset means, and only through those switches occupying predetermined corresponding positions, for reversing the stability condition of the corresponding stages, hence in accordance with the $n$-place binary number representation of the existing position of said rotatable element, a second input circuit means connected to said stages for application thereto individually of stage-reversing signals corresponding respectively to the digits of the $n$-place binary control number, the relative polarities of the respective input circuit connections to said stages causing the same to register the P-complement of one of said binary numbers and add thereto the other of said numbers, thereby to compute a resultant binary number equal to the difference between said numbers, less one, where P is a number one less than $2^n$, add-one circuit means controlled by the last stage in said computer circuit registering said resultant difference number to reverse the stability condition of said first stage if the last stage registers a one, reversible drive means connected to said rotatable element and energizable to rotate the same to a new position corresponding to said control number, said drive means including minus sense control means controlled by said last stage to rotate said element in one direction or the other in accordance with the last digit in said resultant number, thereby to rotate said element directly to such new position thereof, counting means actuated recurringly by progressive rotation of said element toward said new position and applying counting signals to said first stage for reversing the stability condition thereof with each digital increment of rotation of said element on a scale of $2^n$, and stop means operable for interrupting rotation of said element, said stop means being controlled by said last stage and being operated by a reversal in the stability condition of said last stage, thereby to stop said rotatable element at said new position thereof.

17. Digitally controlled means for positioning a rotatable element, comprising in combination with the rotatable element, a computer circuit comprising $n$ consecutively cascaded bistable stages for registering the respective digits of a binary number of $n$ binary places, where $n$ is an integer exceeding one, reversible adder control means conditioning said stages selectively to perform addition or subtraction in response to successive reversals in the stability condition of the first stage, reset means initially actuating said adder means to condition said stages for addition and initially actuating said stages whereby each registers the same binary digit, converter means rotatable with said rotatable element, having $n$ consecutively arranged switches, and means rotationally interconnecting said switches for alternate actuation thereof individually between opposite switching positions at respective recurrence rates proportional to the values of the binary places respectively represented thereby, a first input circuit means connected through the individual switches respectively to the correspondingly arranged computer circuit stages, said circuit means including a source of stage-reversing voltage operable after said reset means, and only through those switches occupying predetermined corresponding positions, for reversing the stability condition of the corresponding stages, hence in accordance with the $n$-place binary number representation of the existing position of said rotatable element, a second input circuit means connected to said stages for application thereto individually of stage-reversing signals corresponding respectively to the digits of the $n$-place binary control number, the relative polarities of the respective input circuit connections to said stages causing the same to register the P-complement of one of said binary numbers and add thereto the other of said numbers, thereby to compute a resultant binary number equal to the difference between said numbers, less one, where P is a number one less than $2^n$, add-one circuit means controlled by the last stage in said computer circuit registering said resultant difference number to reverse the stability condition of said first stage if the last stage registers a one, reversible drive means connected to said rotatable element and energizable to rotate the same to a new position corresponding to said control number, said drive means including minus sense control means controlled by said last stage to rotate said element in one direction or the other in accordance with the last digit in said resultant number, thereby to rotate said element directly to such new position thereof, and means controlled by said last stage and being operated by a reversal in the stability condition of said last stage to stop said rotatable element at said new position thereof.

18. The positioning means defined in claim 17, wherein the converter means switches are arranged consecutively and in consecutively arranged groups, each of the consecutively arranged switches in each group being rotatable directly with the other switches in the same group and comprising a rotatable element having a number of switching elements thereon, defining alternately opposite switching positions with equal spacing between corresponding switching positions thereof, the number of such elements on the consecutively higher switches in each group being half the number of switching elements on the respective immediately preceding switches in the same group, and intermittent motion drive means interposed between the groups for producing intermittent driven rotation of each consecutively higher group by progressive driving rotation of the next lower group, said intermittent motion drive means producing rotation of the driven group through a relatively small angle equal to the spacing between successive corresponding switching positions of the consecutively lowest switch in such driven group by completion of rotation of the driving group through a relatively large angle equal to the spacing between successive corresponding switching positions of the consecutively highest switch in such driving group.

19. The positioning means defined in claim 18, wherein the reversible drive means driving the rotatable element includes speed reduction means operatively interposed between said drive means and said element, having a reduction ratio equal to the product of the respective ratios of said relatively large angle to said relatively small angle of rotation for all the intermittent drive means between all the respective driving and driven switch groups.

20. The positioning means defined in claim 19, wherein the means controlled by the last stage to stop rotation of the element, comprises rotary counting switch means rotatable with the consecutively first group of switches and defining successive switching positions at the same spacing as the spacing between corresponding switching positions of the first switch in said first group, and further comprises circuit means interconnecting said counting switch means and the first stage of said computer circuit, for reversing said stage each time said counting switch means rotates from one switching position to the next succeeding switching position.

21. The positioning means defined in claim 18, wherein the means controlled by the last stage to stop rotation of the element, comprises rotary counting switch means rotatable with the consecutively first group of switches and defining successive switching positions at the same spacing as the spacing between corresponding switching positions of the first switch in said first group, and further comprises circuit means interconnecting said counting switch means and the first stage of said computer circuit, for reversing said stage each time said counting switch means rotates from one switching position to the next succeeding switching position.

22. The positioning means defined in claim 21, wherein the first circuit means comprises $n$ networks respectively connected to the stage-reversing voltage source and between the corresponding consecutively arranged computer circuit stages and converter means switches, said switches in one position thereof permitting passage of stage-reversing voltage from said source to the respectively related stages and in their opposite position preventing such passage.

23. The positioning means defined in claim 20, wherein the bistable stages comprise bistable trigger circuits, the second through the $n^{th}$ stages having two alternately effective, voltage-sensitive conditioning control inputs, and wherein the adder control means comprises a bistable trigger circuit having relatively reversible oppositely related output connections to the respective conditioning control inputs, whereby in one stability condition of said adder control circuit said stages are subjected to a conditioning voltage through one of said control inputs causing said stages to perform addition, and in the opposite stability condition of said adder control circuit said stages are subjected to a similar conditioning control voltage through the other of said control inputs causing said stages to perform subtraction.

24. The positioning means defined in claim 17, wherein the bistable stages comprise bistable trigger circuits, the second through the $n^{th}$ stages having two alternately effective, voltage-sensitive conditioning control inputs, and wherein the adder control means comprises a bistable trigger circuit having relatively reversible oppositely related output connections to the respective conditioning control inputs, whereby in one stability condition of said adder control circuit said stages are subjected to a conditioning voltage through one of said control inputs causing said stages to perform addition, and in the opposite stability condition of said adder control circuit said sages are subjected to a similar conditioning control voltage through the other of said control inputs causing said stages to perform subtraction.

25. Means for converting shaft position into a corresponding binary digital number representation having $n$ places, where $n$ is an integer exceeding two, said means comprising $n$ rotary switches arranged consecutively and in consecutively arranged groups, each of the consecutively arranged switches in each group being rotatable directly with the other switches in the same group and comprising a rotatable element having a number of switching elements thereon, defining alternately opposite switching positions with equal spacing between corresponding switching positions thereof, the number of such elements on the consecutively higher switches in each group being half the number of switching elements on the respective immediately preceding switches in the same group, and intermittent motion drive means interposed between the groups for producing intermittent driven rotation of each consecutively higher group by progressive driving rotation of the next lower group, said intermittent motion drive means producing rotation of the driven group through a relatively small angle equal to the spacing between successive corresponding switching positions of the consecutively lowest switch in such driven group by completion of rotation of the driving group through a relatively large angle equal to the spacing between successive corresponding switching positions of the consecutively highest switch in such driving group.

26. Means for monitoring the rotational position of a driven shaft by converting shaft position into a corresponding binary digital number representation having $n$ places, where $n$ is an integer exceeding two, said means comprising in combination with a shaft to be monitored, drive means, speed reduction means connecting said drive means to said shaft and having a speed reduction ratio of $x$, $n$ rotary switches arranged consecutively and in consecutively arranged groups, each of the consecutively arranged switches in each group being rotatable directly with the other switches in the same group and comprising a rotatable element having a number of switching elements thereon, defining alternately opposite switching positions with equal spacing between corresponding switching positions thereof, the number of such elements on the consecutively higher switches in each group being half the number of switching elements on the respective immediately preceding switches in the same group, and intermittent motion drive means interposed between the groups for producing intermittent driven rotation of each consecutively higher group by progressive driving rotation of the next lower group, said intermittent motion drive means producing rotation of the driven group through a relatively small angle equal to the spacing between successive corresponding switching positions of the consecutively lowest switch in such driven group by completion of rotation of the driving group through a relatively large angle equal to the spacing between successive corresponding switching positions of the consecutively highest switch in such driving group, the product of the respective ratios of said relatively large angle to said relatively small angle of rotation for all the intermittent drive means between all the respective driving and driven switch groups being equal to $x$.

27. Translating apparatus operable for converting angular position of a rotatable shaft into a corresponding binary number representation having $n$ digital places, where $n$ is an integer greater than two, said apparatus comprising in combination with the rotatable shaft, a first set of conjointly rotatable, consecutively arranged binary digital place transducer elements, the consecutively first element in said first set having $z$ similar peripheral segments representing one binary digit symbol separated respectively by equal intervals represeting the opposite binary digit symbol, where $z$ is the number two raised to an integral power, the consecutively second transducer element and any succeeding transducer elements in said first set having half as many similar peripheral segments and separating intervals, with both such segments and such intervals being of twice the peripheral length, as in the transducer elements next preceding said second and successive elements respectively, the consecutively last such transducer element having one such segment and separating interval thereon; at least one additional similarly definable set of transducer elements arranged consecutively with the transducer elements of said first set, the total number of transducer elements in all sets being $n$; drive means for rotating the first set of transducer elements; speed-reduction means cooperating with said drive means for rotating the consecutively second and any succeeding sets of transducer elements intermittently by progressive increments individually equal to $$\frac{1}{2z}$$

of a revolution of the sets next preceding said second and succeeding sets, respectively, such incremental rotational movements of any such set occurring synchonously with the completion of successive revolutions of the next preceding sets, respectively; and a plurality of transducer pickups operatively associated with the respective transducer elements individually and having relatively stationary contact members individually and successively engageable with the peripheral segments of the respective transducer elements rotated past such contact members, the segments of each transducer element bearing such relative angular phasing to those of every other transducer element and to their respective stationary contact members of the associated pickups that during progressive rotation of said transducer elements by said drive means said contact members successively engage and disengage said segments of the individual binary digital place transducer elements in accordance with the mathematical sequence in which the respective binary digital place symbols thereof alternate to represent progressive point by point change of a number represented at any instant by all of said transducer elements; and means rotatively interconnecting said shaft and said drive means for causing rotation of said shaft thereby at the same effective rate as the last of said consecutively arranged sets of transducer elements, whereby the rotative positioning of said shaft is continuously represented in binary digital form, to $n$ digital places, by the positions of engagement and disengagement of segments of said transducer elements by said pickup contact members.

28. The translating apparatus defined in claim 27, wherein the intermittent drive means comprises a Veeder-counter type intermittent motion.

29. The translating apparatus defined in claim 27, wherein the transducer elements comprise disk-like switch members having peripherally arranged switch contact segments separated by insulation, and switch contact wiper elements slidably engaging the peripheries of the respective switch members.

30. Means for converting shaft position into a corresponding binary digital number representation having $n$ places, where $n$ is an integer exceeding two, said means comprising $n$ rotary switches arranged consecutively and in consecutively arranged groups, each of the consecutively arranged switches in each group being rotatable directly with the other switches in the same group and comprising a rotatable element having a number of switching elements thereon, defining alternately opposite switching positions with equal spacing between corresponding switching positions thereof, the number of such elements on the consecutively higher switches in each group being half the number of switching elements on the respective immediately preceding switches in the same group, and intermittent motion drive means interposed between the groups for producing intermittent driven rotation of each consecutively higher group by progressive driving rotation of the next lower group, said intermittent motion drive means producing rotation of the driven group through a relatively small angle equal to the spacing between successive correspoding switching positions of the consecutively lowest switch in such driven group by completion of rotation of the driving group through a relatively large angle equal to the spacing between successive corresponding switching positions of the consecutively highest switch in such driving group, electrical counting circuit means including $n$ consecutively cascaded bistable stages, each such stage having a reset control element initially energizable for resetting said stages to like stability conditions, and each such stage having a digital control element energizable by a discrete electrical impulse for reversing the stability condition of the stages subjected to such impulse, a source of such an impulse, said rotary switches individually including switch contacts subject to opening and closing respectively in the successively opposite switching positions of said switches, and circuit means connecting the respective switch contacts to the corresponding consecutively arranged stages for permitting or preventing application of said source impulse to said stages selectively in accordance with the instantaneous switching positions of the respective switches.

31. Translating apparatus operable to represent the position of a movable element in binary digital form, comprising, in combination with the movable element, a plurality of switches and individual operating means therefor corresponding respectively to the binary places of the binary number representation, said individual switch operating means being operatively associated with said movable element to open and close their respective switches alternately with predetermined relative phasing and at recurrence rates proportional to the digital values of the binary places represented by the respective switches, accompanying progressive positional change of said movable element, electric storing circuit means comprising a plurality of bistable stages individually connected in circuit with the respective switches, means for resetting said stages initially to like stability conditions, electrical impulse actuated means operatively associated with the individual stages, energizable through their respectively associated switches to reverse the stability condition of only those stages whose switches occupy a particular switching position at the time of the energizing impulse, and source means for applying such an energizing impulse in any of said representable positions of said movable element, whereby the stages of said storing circuit means are raised to represent the binary place digits of a binary number corresponding to the instantaneous position of such an element.

32. Translating apparatus as defined in claim 31, wherein the storing circuit comprising an adder circuit having consecutively cascaded stages, and input circuit means for applying to the circuit stages control impulses representing the digits of a binary number having the same number of binary places as the said positional binary number, the polarities of the connections of said input circuit means relative to those of said source means to the respective stages being relatively reversed so that one of said binary numbers registered directly therein whereas the P-complement of the other of said numbers is registered in said stages for addition to the first-mentioned registered number, the number P being equal to the $2^n$, less one, where $n$ equals the number of binary places, and means operable to add one to the resulting sum registered in the adder circuit, thereby to convert such sum into the true difference between said two binary numbers.

33. Translating apparatus operable to add one number in binary digital form to a second binary number representing the position of a movable element comprising in combination with the movable element a plurality of switches and individual operating means therefor corresponding respectively to the binary places of the second binary number, said individual switch operating means being operatively associated with said movable element to open and close their respective switches alternately with predetermined relative phasing and at recurrence rates proportional to the digital values of the binary places represented by the respective switches, accompanying progressive positional change of said movable element, electrical counting circuit means having a plurality of bistable stages individually connected in circuit with the respective switches, means operable in accordance with the first binary number for selectively applying stability-reversing energization to individual stages corresponding to those binary places of such first binary number having a particular one of the two binary digits in such places, respectively, and electric impulse means operable through the individual switches for applying stability-reversing energization to the respectively associated stages whose switches instantaneously occupy a particular switching position, one of said energizing means operating after the other such means and operating sequentially for application of stability-reversing energization thereby to the respective stages in consecutive order of the stages in said counting circuit with sufficient time interval between energization of successive stages thereby to permit carryovers to the respectively succeeding stages in performing addition of said binary numbers.

34. In combination, counter means having plurality of cascaded elements consecutively arranged to represent binary digital places and each having two electrically reversible stability conditions representative of the two binary digits "1" and "0" respectively, electromechanical transducer means including a plurality of transducer elements respectively associated with said counter elements and having two mechanically reversible electrical conditions representative of said two binary digits, respectively, means operable by progressive displacement of said rotatable element by which said transducer elements individually are reversed between said electrical conditions thereof at a repetition rate proportional to the product of rotatable element displacement and the value of the binary places represented by the counter elements respectively, and further including electrical impulse means actuating said counter elements individually into stability conditions corresponding respectively to the stability conditions of the respective transducer elements, thereby to represent the rotatable element's position in binary digital form, and means for selectively reversing the stability conditions of the counter elements in consecutive order in accordance with the binary place digits of a second binary number to be added to that representing rotatable element position.

35. Translating apparatus for detecting the magnitude and sense of the difference between a binary number having "$n$" binary places and the binary number representation of a variable quantity on a scale of $2^n$, said apparatus comprising counter means including "$n$" consecutively cascaded bistable elements having opposite stability conditions representative of the alternate digits of the respective binary places, means for setting said counter means elements initially with like stability conditions, means operable for selectively reversing the stability conditions of certain of said bistable elements in accordance with the respective digits of one of said binary numbers, means separately operable for selectively reversing the stability conditions of certain of said bistable elements in consecutive order thereof in accordance with the binary place digits of the other binary number to represent the absolute difference between said binary numbers, and counter-controlled output means thereafter operable to produce an output response, representing the change in said quantity, proportional in amount to the magnitude of said absolute difference, said output means being controlled by the consecutively last element in said counter means for determining the directional sense of said output response in accordance with the existing stability condition in said last element.

36. Apparatus for establishing the setting of a controlled element in correspondence with a digital control number, said apparatus comprising computer means having one input means arranged to be controlled by said control number and a second input means connected to be controlled by the existing setting of said controlled element, said computer means comprising a plurality of digit-representing elements cooperatively arranged to a register a number corresponding to the difference between said control number and said existing setting number, on a scale of $2^n$, where $n$ is an integer, one of said digit-representing elements having a binary number value of $$\frac{2^n}{2}$$

reversible drive means energizable for actuating said controlled element selectively in either sense of change of said existing setting number, and means controlled by said computer means for selectively energizing said drive means according to the setting of said latter digit-representing element, thereby to actuate said controlled element in the most direct sense toward the value corresponding to the control number.

37. Apparatus for establishing the setting of a controlled element in correspondence with a digital control number, said apparatus comprising computer means comprising a plurality of digit-representing elements cooperatively arranged to register a number corresponding to the difference between said control number and a number representing the existing setting of said controlled element, on a scale of $2^n$, where $n$ is an integer, one of said digit-representing elements having a binary number value of $$\frac{2^n}{2}$$

and means controlled by said one digit-representing element for actuating said controlled element in the most direct sense toward the value corresponding to the control number.

References Cited in the file of this patent

Digital Servomechanism, Thomason, L. S., Electronics, August 1954, pp. 134–139.